US 12,556,072 B2

(12) United States Patent
Yoshida et al.

(10) Patent No.: US 12,556,072 B2
(45) Date of Patent: Feb. 17, 2026

(54) COIL FORMING APPARATUS AND COIL FORMING METHOD

(71) Applicant: HONDA MOTOR CO., LTD., Tokyo (JP)

(72) Inventors: Eishi Yoshida, Tokyo (JP); Yutaka Matsumoto, Tokyo (JP); Junya Ochiai, Tokyo (JP); Shuhei Okuda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 574 days.

(21) Appl. No.: 18/054,145

(22) Filed: Nov. 10, 2022

(65) Prior Publication Data

US 2023/0145534 A1 May 11, 2023

(30) Foreign Application Priority Data

Nov. 11, 2021 (JP) ................................. 2021-184385

(51) Int. Cl.
*H02K 15/048* (2025.01)
*H02K 3/28* (2006.01)

(52) U.S. Cl.
CPC .......... *H02K 15/0485* (2013.01); *H02K 3/28* (2013.01)

(58) Field of Classification Search
CPC .... H02K 15/0485; H02K 3/28; H02K 15/066; H02K 15/12; H02K 15/043; Y02T 10/64
See application file for complete search history.

(56) References Cited

U.S. PATENT DOCUMENTS

| 2003/0098379 A1 | 5/2003 | Stockman et al. |
| 2004/0261256 A1 | 12/2004 | Sadiku |
| 2004/0261885 A1 | 12/2004 | Sadiku |

(Continued)

FOREIGN PATENT DOCUMENTS

| JP | 2004248434 A | 9/2004 |
| JP | 2007020251 A | 1/2007 |

(Continued)

OTHER PUBLICATIONS

Office Action issued Apr. 9, 2025 in the related CN Patent Application No. CN202210175938.1.

(Continued)

*Primary Examiner* — Jeffrey T Carley
*Assistant Examiner* — Jose K Abraham
(74) *Attorney, Agent, or Firm* — CKC & Partners Co. LLC

(57) ABSTRACT

A coil forming apparatus is configured so as to, upon forming a band-shaped coil having side ends at both ends of a plurality of straight portions, in the course of pivotally conveying the band-shaped coil along the outer circumference of a coil winding jig by a coil conveying mechanism, sandwich the side end by a reforming portion of guide member, reform the band-shaped coil into an arc shape, then insert a plurality of the straight portion into a respective one of the plurality of comb-shaped grooves with reducing a diameter of guiding transfer way of the guide member while pressing a steady laminated part of the band-shaped coil in sliding contact manner, thereby inserting a plurality of the straight portion into a respective one of the plurality of comb-shaped grooves, possible of easily forming the band-shaped coil into a precisely wound state.

6 Claims, 16 Drawing Sheets

(56) References Cited

U.S. PATENT DOCUMENTS

| | | | |
|---|---|---|---|
| 2009/0001841 A1* | 1/2009 | Naganawa | H02K 15/0433 |
| | | | 29/735 |
| 2009/0121576 A1 | 5/2009 | Even et al. | |
| 2010/0259124 A1 | 10/2010 | Bodin et al. | |
| 2011/0000078 A1 | 1/2011 | Gorohata et al. | |
| 2011/0041319 A1* | 2/2011 | Gorohata | H02K 15/24 |
| | | | 29/596 |
| 2012/0223611 A1* | 9/2012 | Watanabe | H02K 1/26 |
| | | | 29/603.01 |
| 2014/0196282 A1 | 7/2014 | Stephenson et al. | |
| 2017/0229936 A1 | 8/2017 | Kang et al. | |
| 2018/0367015 A1* | 12/2018 | Sadiku | H02K 15/0433 |

FOREIGN PATENT DOCUMENTS

| | | | |
|---|---|---|---|
| JP | 2008283736 A | 11/2008 | |
| JP | 4953032 B2 | 6/2012 | |
| JP | 2013080854 A | 5/2013 | |

OTHER PUBLICATIONS

Office Action issued Oct. 29, 2025 in the CN Patent Application No. CN202211404627.4.

* cited by examiner

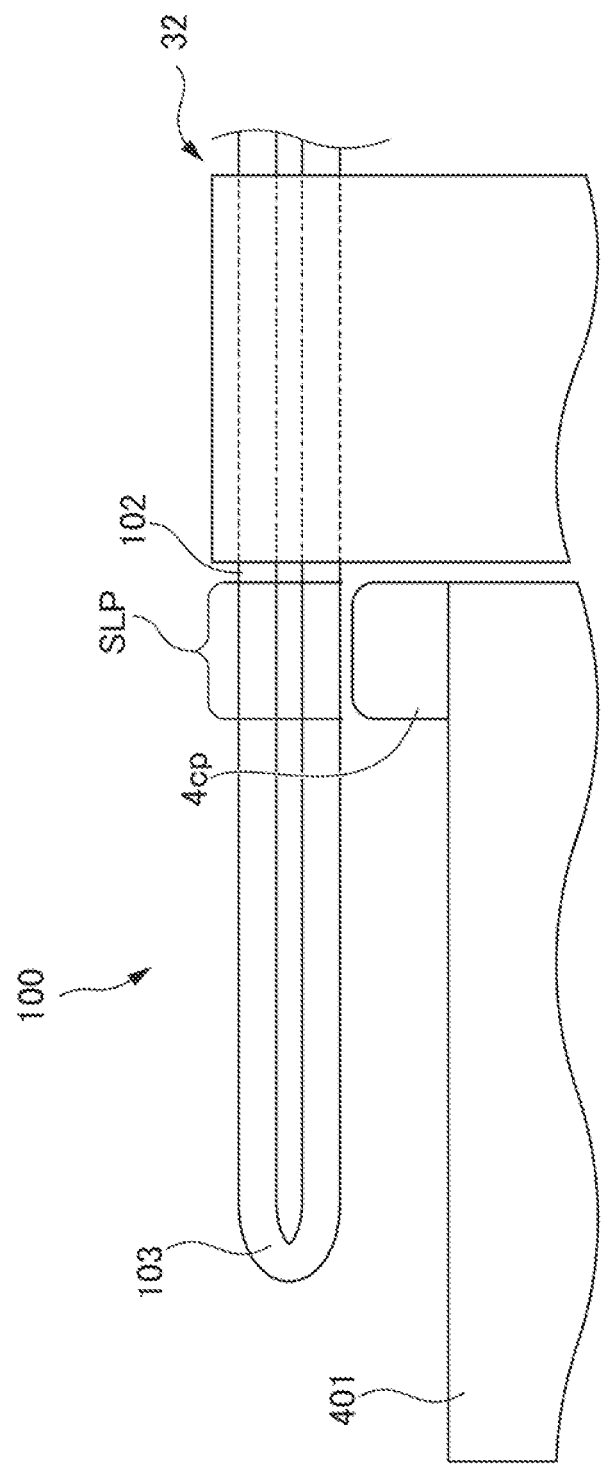

COIL FORMING APPARATUS AND COIL FORMING METHOD

This application is based on and claims the benefit of priority from Japanese Patent Application No. 2021-184385, filed on 11 Nov. 2021, the content of which is incorporated herein by reference.

BACKGROUND OF THE INVENTION

Field of the Invention

The present invention relates to a coil forming apparatus and a coil forming method.

Related Art

The stator of a rotary electric machine has a band-shaped coil in a wound state. The band-shaped coil is formed in advance in a substantially cylindrical wound state having a smaller diameter than the inside diameter of the stator core, and is inserted inside of the stator core. The band-shaped coil in the wound state is expanded in diameter inside of the stator coil, and is mounted by inserting the straight portion of the band-shaped coil into a slot of the stator core.

Conventionally, it has been known to mold the band-shaped coil into a wound state of substantially cylindrical shape by winding on a core member, while feeding by one pitch at a time on the columnar core member (for example, refer to Patent Document 1).

Patent Document 1: Japanese Patent No. 4953032

SUMMARY OF THE INVENTION

In the above prior art, there is no specific disclosure about who the core member winds the band-shaped coil.

However, since the band-shaped coil is formed by folding conductors made of metal, spring back occurs due to the elasticity of the conductor itself. For this reason, there has been a problem in that difficulty accompanies smooth forming the band-shaped coil into a wound state with precision. If the band-shaped coil does not become the wound state precisely, poor quality occurs, and leads to a decline in yield. Consequently, wasteful consumption of material due to inferior product being produced, and the running time of equipment until reaching the quantity of production plan extends and thus electrical consumption increases, which is associated with adverse impact on the global environment.

The present invention has an object of providing a coil forming apparatus and a coil forming method capable of smoothly forming a band-shaped coil into a precisely wound state. In addition, it is consequently leads to suppressing wasteful consumption of material and the consumption of electrical energy by shortening the running time of equipment, and thus decreases the adverse effects on the global environment.

A coil forming apparatus (for example, the coil forming apparatus 1 described later) according to a first aspect of the present invention forms a band-shaped coil (for example, the band-shaped coil 100 described later) in a wound state, the band-shaped coil including a plurality of straight portions (for example, the straight portion 102 described later) and side ends (for example, the side end 103 described later) provided on both ends of the plurality of straight portions, the coil forming apparatus comprising: a coil winding jig (for example, the coil winding jig 2 described later) that winds the band-shaped coil, the coil winding jig including a plurality of comb-shaped grooves (for example, the comb-shaped groove 23 described later) on an outer periphery thereof, each of which can hold a respective one of the plurality of straight portions therein; a coil conveying mechanism (for example, the coil conveying mechanism 3 described later) that pivotally conveys the band-shaped coil along at least, a portion of the outer periphery of the coil winding jig; and guide members (for example, the guide member 4 described later) that are provided in a vicinity of both ends of the coil winding jig in an axial direction, and guide the band-shaped coil in an arc shape following an outer circumference of the coil winding jig while being in contact with the side end, and insert the plurality of straight portions respectively into the plurality of comb-shaped grooves by a second half portion (for example, the second half portion 313b described later) of pivotal conveying of the band-shaped coil, in which the guide member has a reforming portion (for example, the reforming portion 42 described later) which deforms and reforms the band-shaped coil into an arc shape following the outer circumference of the coil winding jig, in a state sandwiching the side end of the band-shaped coil in a first half portion (for example, the first half portion 313a described later) of pivotal conveying of the band-shaped coil, and has, at least in the reforming portion, a projecting-strip pressing portion (for example, the projecting-strip pressing portion 4cp described later) which is projected along a circumferential direction at an inner circumferential side of the guide member so as to be in sliding contact with a steady laminated part (for example, the steady laminated part SLP described later) of the band-shaped coil in which a partial difference in coil lamination number does not arise at a folding portion extending from the straight portion to the side end.

According to a second aspect of the present invention, in the coil forming apparatus as described in the first aspect, the guide member may be configured to include an outer-circumferential guide member (for example, the outer-circumferential guide member 401 described later) of a curvature in which an inner-circumferential surface side follows an outer circumference of the coil winding jig, and the projecting-strip pressing portion may be projected at an inner-circumferential surface of the outer-circumferential guide member.

A coil forming method according to a third aspect of the present invention is for forming a band-shaped coil (for example, the band-shaped coil 100 described later) having a plurality of straight portions (for example, the straight portion 102 described later) and side ends (for example, the side end 103 described later) disposed at both ends of the plurality of straight portions into a wound state, by winding on a coil winding jig (for example, the coil winding jig 2 described later) having a plurality of comb-shaped grooves (for example, the comb-shaped groove 23 described later) on an outer periphery thereof, each of which can hold a respective one of the plurality of straight portions therein, the method comprising: a pivotal conveying step of pivotally conveying the band-shaped coil along at least part of an outer circumference of the coil winding jig; and a guiding step of using guide members (for example, the guide member 4 described later) respectively arranged in a vicinity of both ends of the coil winding jig in an axial direction to guide the side ends of the band-shaped coil into an arc shape following an outer circumference of the coil winding jig, and inserting the plurality of straight portions into a respective one of the plurality of comb-shaped grooves (for example, the comb-shaped groove 23 described later) by a second half portion (for example, the second half portion 313b described later) of pivotal conveying of the band-shaped coil, in which the guiding step includes a reforming step (for example, step performed by reforming portion 42 described later) of deforming and reforming the band-shaped coil into an arc shape following an outer circumference of the coil winding jig, in a state sandwiching the side end of the band-shaped coil by a first half portion of pivotal conveying of the band-shaped coil, and the guiding step, at least in the reforming step, presses and reforms a steady laminated part (for example, the steady laminated part SLP described later) of the band shaped coil in which a partial difference in a coil lamination number does not arise by a folding portion extending from the straight portion to the side end, while in sliding contact by projecting-strip pressing portion (for example, the projecting-strip pressing portion 4*cp* described later) which is projected along a circumferential direction at an inner circumferential side of the guide member.

According to the coil forming apparatus as described in the first aspect, the guide member guides the band-shaped coil into an arc shape along the outer circumference of the coil winding jig while brought into contact with the side end, and guides so as to insert the plurality of straight portions into a respective one of the plurality of comb-shaped grooves by the second half portion of pivotal conveying of the band-shaped coil. In the guide portion of at least the reforming portion in this guiding, upon deforming and reforming the band-shaped coil into an arc shape along the outer circumference of the coil winding jig, the projecting-strip pressing portion projected along the circumferential direction at the inner circumferential side of the guide member reforms the band-shaped coil so as to abut the steady laminated part thereof. The steady laminated part is a part at which a partial difference in the coil lamination number does not arise at the folding part extending from the straight portion to side end of the band-shaped coil. For this reason, even if a band-shaped coil having a partial difference in lamination coil number at a place which Is not a steady laminated part, since there is no difference in the coil lamination number at the abutting site of the projecting-strip pressing portion, so-called looseness in which adjacent coil conducts become uneven will not arise, it is possible to make unforming winding habit, and the band-shaped coil can be smoothly formed in a precisely wound state.

According to the coil forming apparatus as described in the second aspect, the guide member is configured to include the outer-circumferential guide member of a curvature in which the inner-circumferential surface side follows the outer circumference of the coil winding jig, and the projecting-strip pressing portion is projected at the inner circumferential surface of the outer-circumferential guide member. Therefore, it is possible to provide the projecting-strip pressing portion at a position suited to pressing the steady laminated part at which a partial difference in coil lamination number does not arise, while in sliding contact.

According to the coil forming apparatus as described in the third aspect, in at least the reforming step of the guiding step, upon the reforming portion deforming and reforming the band-shaped coil into an arc shape following the outer circumference of the coil winding jig, the projecting-strip pressing portion projected along the outer circumference at the outer circumferential side of the guide member reforms by pressing the steady laminated part of the band-shaped coil while in sliding contact. The steady laminated part is a part at which a partial difference in the coil lamination number does not arise at the folding part extending from the straight portion to side end of the band-shaped coil. For this reason, even if a band-shaped coil having a partial difference in lamination coil number at a place which is not a steady laminated part, since there is no difference in the coil lamination number at the abutting site of the projecting-strip pressing portion, looseness in the coil conductor arrangement will not arise, it is possible to make unforming winding habit, and the band-shaped coil can be smoothly formed in a precisely wound state.

In addition, the coil forming apparatuses as described in the first to third aspects are collectively premised on using material made into a series of band-shaped coils in advance, as the coils set in the stator. Upon setting the coil into the slot of the stator, the current mainstream technique is a technique which divides and forms the coil into a plurality of segments, and after inserting into the slots, welds the coil ends. In this general technique, it is necessary to use high purity copper in the coil so as to be able to withstand the thermal processing at the weld location. In contrast, since coping with the thermal processing is unnecessary with the present invention, it is possible to use recycled copper wire containing impurities, which can contribute to the realization of the recycling of resources.

BRIEF DESCRIPTION OF THE DRAWINGS

FIG. 15 is a view showing the vicinity of a contact site between the projecting-strip pressing portion of FIG. 13 and band-shaped coil to be enlarged;

DETAILED DESCRIPTION OF THE INVENTION

Figure 1:
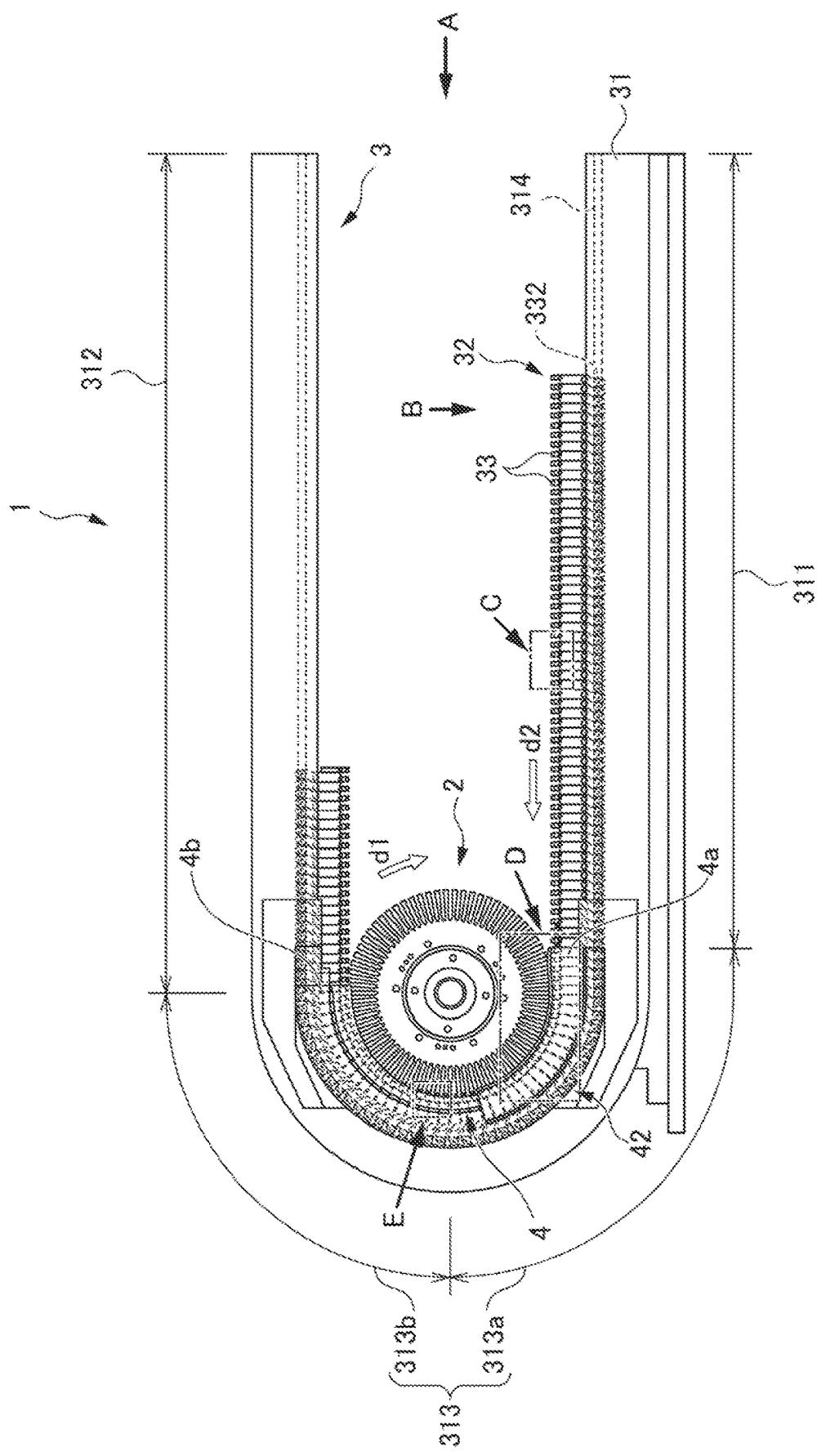
FIG. 1 is a side view showing an embodiment of a coil forming apparatus of the present invention.

Hereinafter, embodiments of the present invention will be explained. As shown in FIG. 1, a coil forming apparatus 1 of the present embodiment includes: a coil winding jig 2; a coil conveying mechanism unit 3 which causes a band-shaped coil 100 to convey along the outer circumference of the coil winding jig 2; and a pair of guide members 4 which guide the band-shaped coil 100 conveyed by the coil conveying mechanism unit 3 so as to be wound on the coil winding jig 2.

(Band-Shaped Coil)

Figure 3:
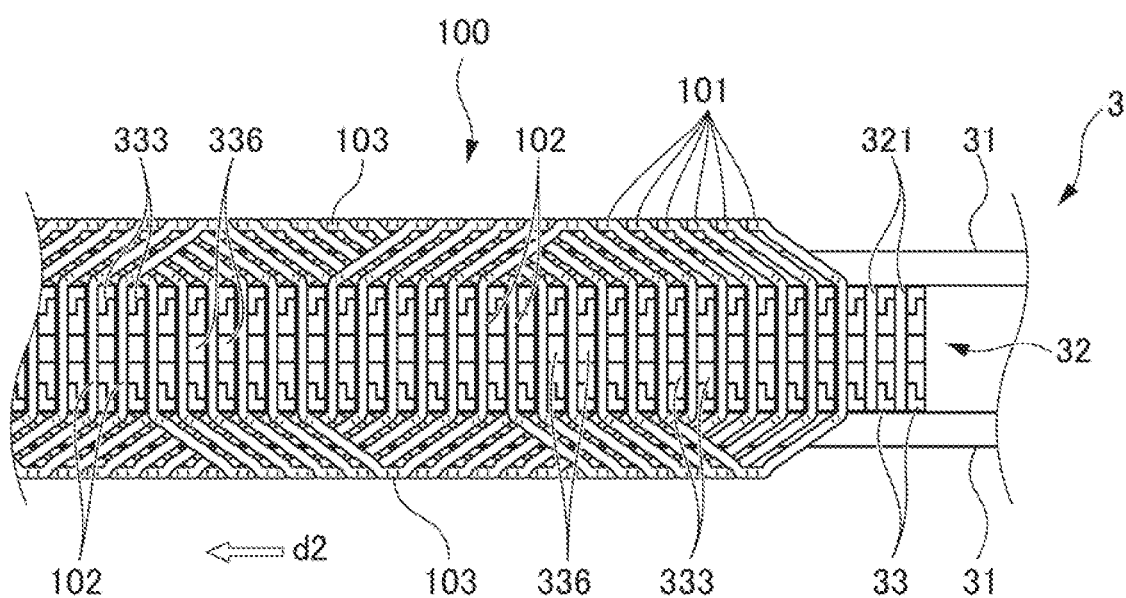
FIG. 3 is a drawing viewing the coil forming apparatus shown in FIG. 1 from the B direction in FIG. 1.

As shown in FIG. 3, the band-shaped coil 100 is molded into an elongated corrugated band-shape by rectangular conductor wires 101 having a substantially rectangular cross-sectional shape. The rectangular conductor wires 101 are formed from a metal having high conductivity such as copper or aluminum, for example.

The coil conductor of the band-shaped coil 100 includes a plurality of straight portions 102 and a plurality of side ends 103. The straight portions 102 are parts to be inserted in a slot provided in the inner circumference of a stator core which is not illustrated, and are arranged in parallel at a predetermined interval to extend substantially linearly in the same direction, respectively. The side ends 103 are respectively arranged at a position closer to the side end of the band-shaped coil 100 than the straight portion 102, i.e. at both ends in the extending direction of the straight portion 102. The side ends 103 couple adjacent straight portions 102 at one end portion and the other end portion alternately in a mountain shape, and constitute coil end parts, each projecting in an axial, direction of the stator core from the stator, upon the band-shaped coil 100 being mounted to the stator of the stator core.

The band-shaped coil 100 of the present, embodiment is provided in an elongated band shape by arranging six rectangular conductor wires 101 in a manner in which the plurality of straight portions 102 are provided in parallel to each other at a constant interval, and the plurality of side ends 103 are shifted by the pitch of the straight portions 102 to be stacked. The six rectangular conductor wires 101 are provided by folding the plurality of straight portions 102 and the plurality of side ends 103 respectively in a corrugated shape. The straight portions 102 of the band-shaped coil 100 are stacked in the thickness direction (the vertical direction relative to the paper plane of FIG. 3) of the band-shaped coil 100 by folding back the rectangular conductor wire 101 in the middle. The band-shaped coil 100 of the present embodiment has a length that is wound four times around the coil winding jig 2 to be described later.

(Coil Winding Jig)

Figure 4:
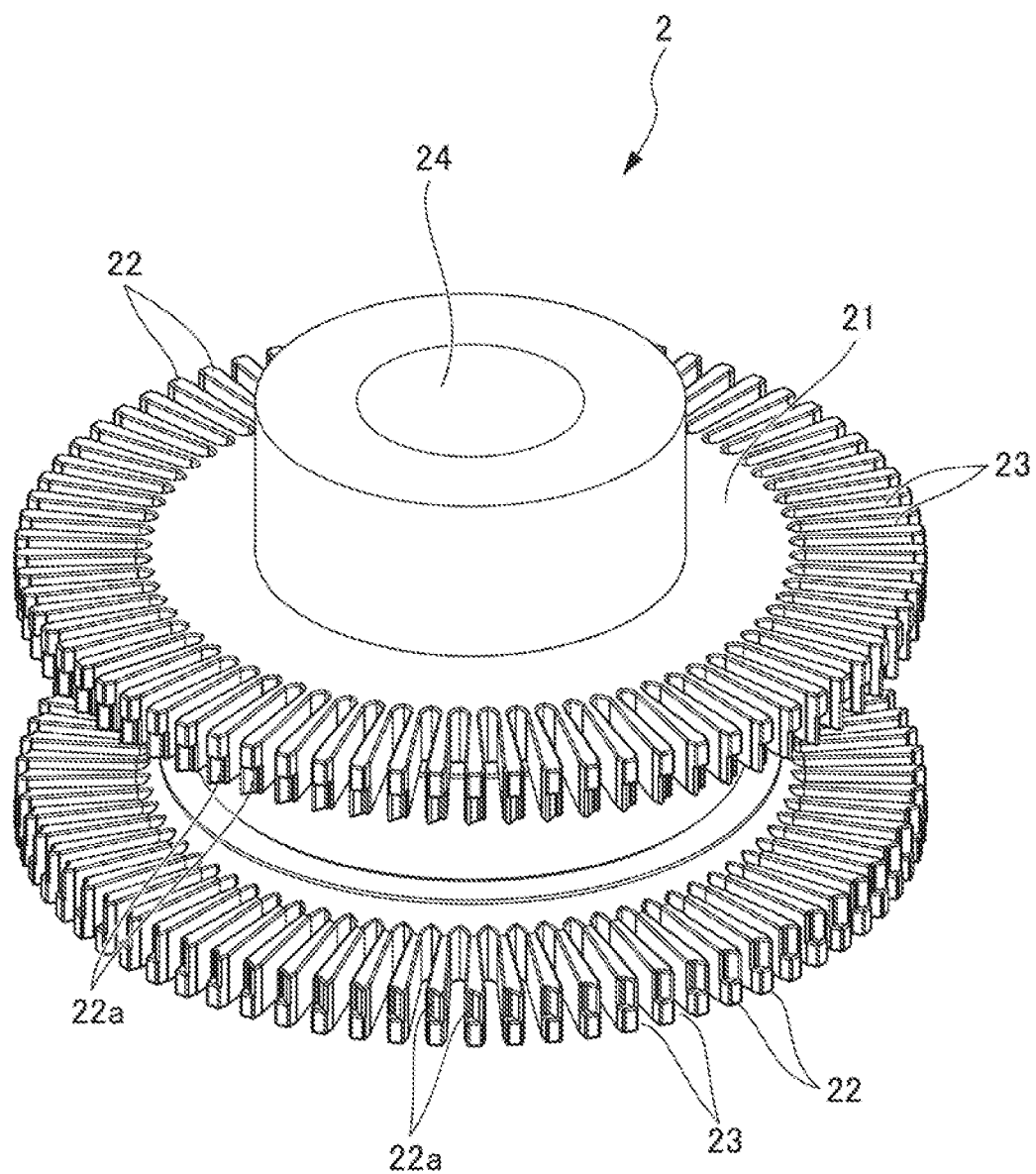
FIG. 4 is a perspective view showing an embodiment of a coil winding jig.

As shown in FIG. 4, the coil winding jig 2 includes: a substantially cylindrical jig main body 21; a plurality of comb teeth 22 protruding radially to the outer circumference of the jig main body 21, a plurality of comb teeth-shaped grooves 23 provided between the adjacent comb teeth 22, 22 in the circumferential direction, end an axial hole 24 opened at the center of the jig main body 21. The comb teeth 22 and comb teeth-shaped groove 23 are respectively provided at both ends in the axial direction of the jig main body 21. The phases of the comb teeth 22 and comb teeth-shaped groove 23 at one end of the jig main body 21 and the comb teeth 22 and comb teeth-shaped groove 23 at the other end are aligned. The coil winding jig 2 of the present embodiment has 72 comb teeth-shaped grooves 23 respectively at both ends in the axial direction of the jig main body 21. The number of these comb teeth-shaped grooves 23 matches the number of slots in the stator core in which the band-shaped coils 100 are mounted.

The interval distance between the comb teeth 22 and comb teeth-shaped groove 23 at one end of the jig main body 21 and the comb teeth 22 and comb teeth-shaped groove 23 at the other end is substantially equal to the length in the extending direction of the straight portion 102 of the band-shaped coil 100. Therefore, the straight portion 102 of the band-shaped coil 100 can be accommodated over the comb-shaped groove 23 at one end and the comb-shaped groove 23 at the other end of the jig main body 21.

The coil winding jig 2 is formed so that the outside diameter of the coil winding jig 2 defined by the position of the leading end of the comb teeth 22 is no more than the inside diameter of the stator core, so that it becomes possible to insert inside of the stator core. The coil winding jig 2 is arranged at a predetermined site of the coil forming apparatus 1, and is provided to be rotatable in the d1 direction shown by the arrow in FIG. 1, centered around the axial hole 24 by driving of a motor which is not illustrated.

(Coil Conveying Mechanism Unit)

Figure 2:
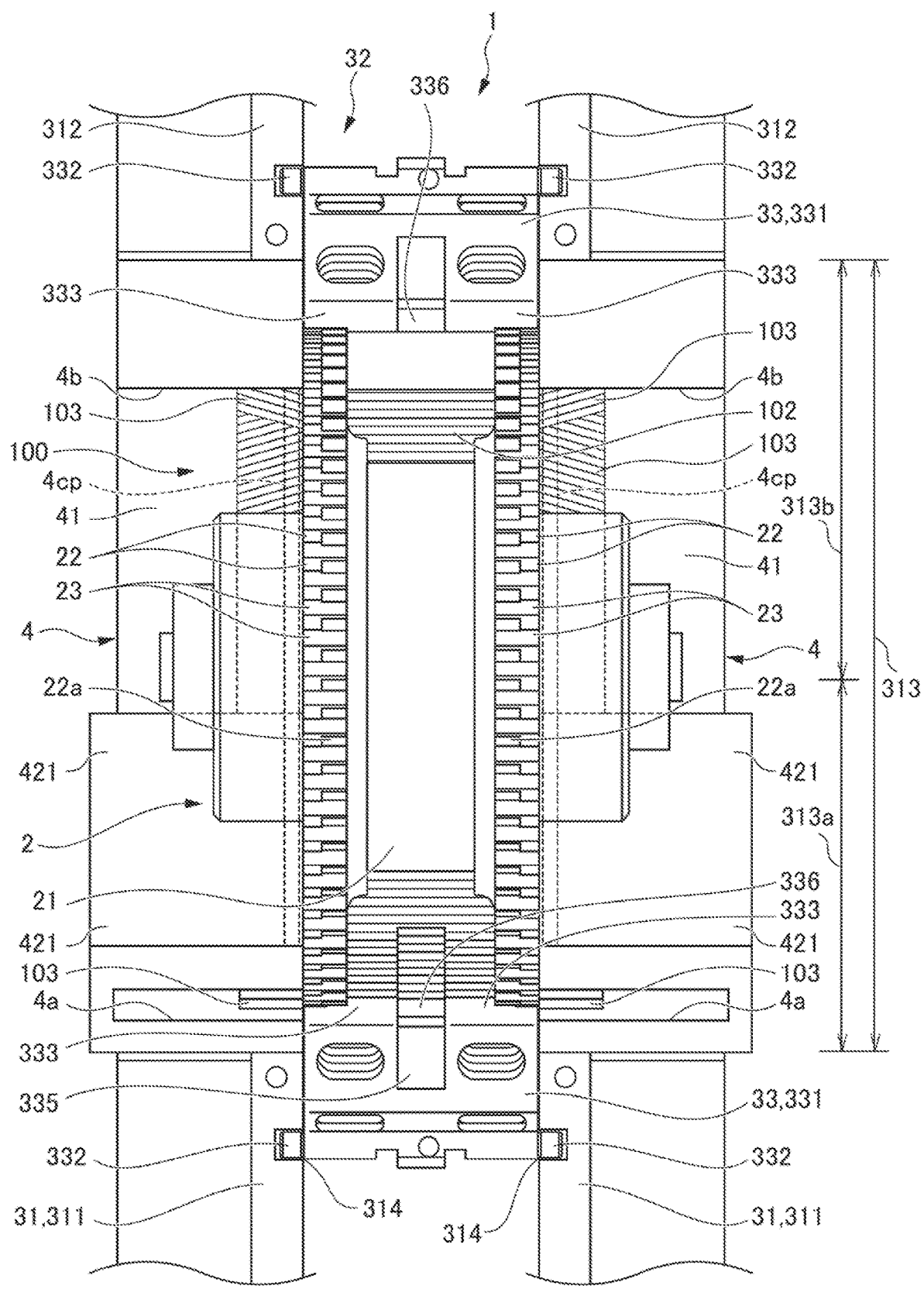
FIG. 2 is a drawing viewing the coil forming apparatus shown in FIG. 1 from the A direction in FIG. 1.

The coil conveying mechanism unit 3 pivotally conveys the band-shaped coil 100 along at least part of the outer circumference of the coil winding jig 2. More specifically, the coil conveying mechanism unit 3 has a pair of conveying rails 31 constituting a conveying path of the band-shaped coil 100, and a conveyor 32 which grips the band-shaped coil 100 and conveys along the conveying rails 31, as shown in FIGS. 1 and 2.

The conveying rails 31 are formed in a band-shaped plate made of metal, and arranged in parallel to each other with substantially equal intervals to the length of the straight portion 102 of the band-shaped coil 100, in the width direction of the coil forming apparatus 1. The interval of the pair of conveying rails 31 is substantially equal to the interval distance in the axial direction of the comb teeth 22 and comb-shaped groove 23 of the coil winding jig 2, as shown in FIG. 2.

The conveying rails 31 includes a pair of upper and lower parallel linear conveying parts 311, 312 forming a linear conveying path, and a pivot conveying unit. 313 which connects the ends of the linear conveying parts 311, 312 in an arc shape, thereby forming a lateral U-shaped conveying path. The conveying rails 31 are provided so as to surround the coil winding jig 2 by arranging on the inner side of the U-shaped portion, so that the pivot conveying unit 313 follows the outer circumference of the coil winding jig 2. As shown in FIG. 2, pairs of guide grooves 314 spanning the entire length of the conveying rail 31 are respectively provided to the faces on which the pair of conveying rails 31 are opposing each other. The guide groove 314 forms a travel path of a conveyor 32 described later.

In the present embodiment, the pivot conveying unit 313 of the coil conveying mechanism unit 3 is formed along a range approximately ½ of the outer circumference of the coil winding jig 2. The pivot conveying unit 313 includes a first half portion 313a on the introducing side of the band-shaped coil 100 and a second half portion 313b on the discharging side of the band-shaped coil 100. The first half portion 313a is formed over a range of approximately ½ the first half of the pivot conveying unit 313. The second half portion 313b is provided over a range of approximately ½ the second half of the pivot conveying unit 313. However, the pivot conveying unit 313 may be configured to be able to pivotally convey the band-shaped coil 100 along at least a portion of the outer periphery of the coil winding jig 2.

The conveyor 32 extends long along the conveying rail 31 and can move along the conveying rail 31 between the pair of conveying rails 31. The conveyor 32 has a length corresponding to at least the total length of the band-shaped coil 100, and moves along the conveying rail 31 in a state of holding the straight portions 102 of the band-shaped coil 100 on the upper surface, thereby pivotally conveying the band-shaped coil 100 along the outer periphery of the coil winding jig 2.

Figure 5:
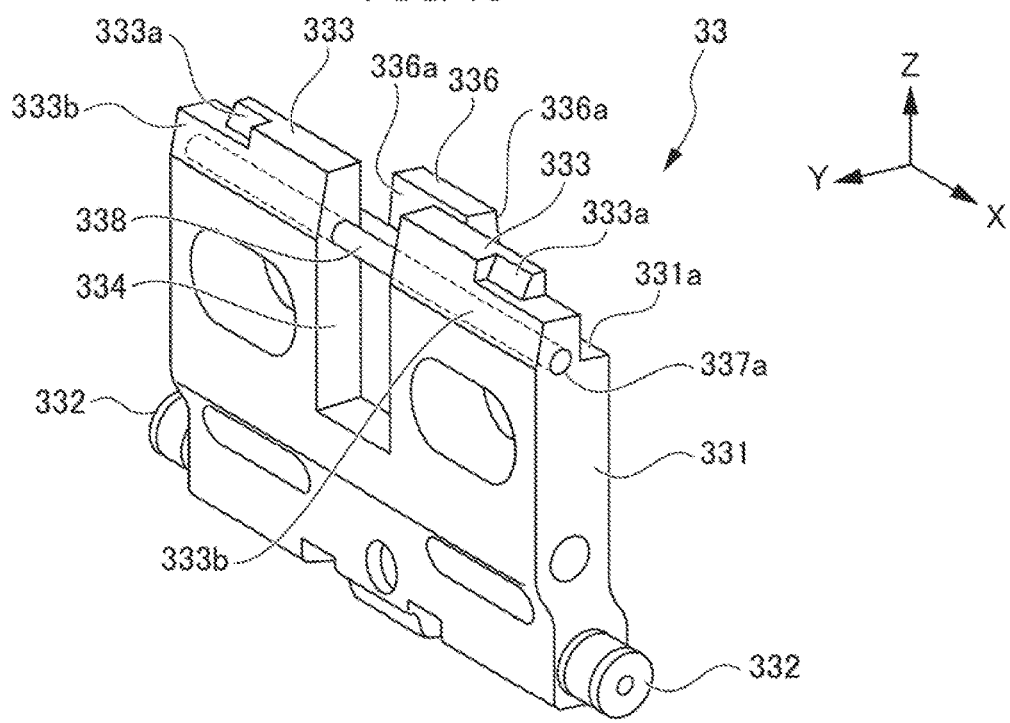
FIG. 5 is a perspective view showing a piece member of a grip portion of a coil conveying mechanism unit.
Figure 6:
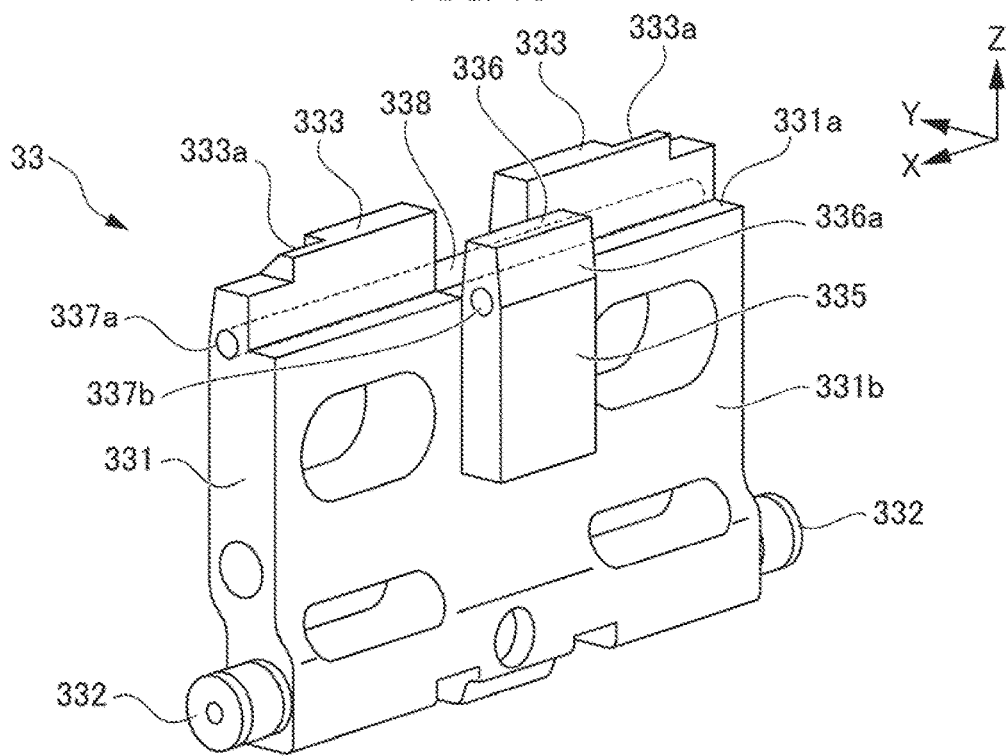
FIG. 6 is a perspective view showing an aspect viewing the piece member of the grip portion of the coil conveying mechanism unit from the opposite side of FIG. 5.
Figure 7:
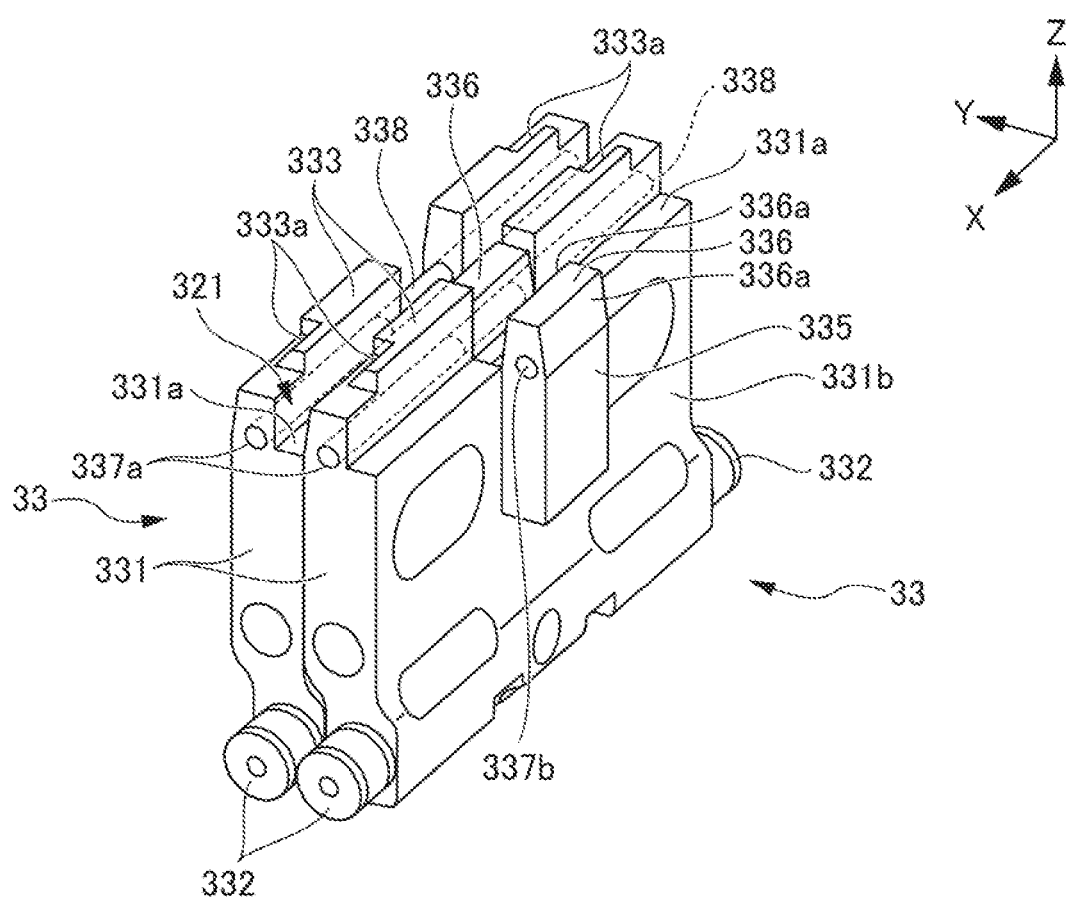
FIG. 7 is a perspective view showing a state connecting two piece members.

As shown in FIGS. 1 and 3, the conveyor 32 includes a plurality of piece members 33 of the same structure arranged in a multilayer shape along the length direction of the band-shaped coil 100. As shown in FIGS. 5, 6 and 7, the piece members 33 each include a piece member body 331 having a substantially rectangular plate-like shape made of metal, and a pair of guide projections 332, each projecting laterally from both ends in the width direction at the lower end of the piece member body 331. The guide projections 332 of the present embodiment each include a rotatable roller; however, they may be simple projections. In addition, regarding the directions of the piece member 33, in FIGS. 5, 6, and 7, the X direction is defined as the width direction, the Y direction is defined as the thickness direction, and the Z direction is defined as the height direction. In the height direction, the upper direction in the drawings is defined as "up", and the lower direction is defined as "down".

The piece member body 331 has a thickness substantially equal to the gap between adjacent straight portions 102 and 102 in the length direction of the band-shaped coil 100. The piece member body 331 has an upper end surface 331a, and the upper end surface 331a includes a pair of first gripping claws 333, each projecting in the height direction. The first gripping claw 333 has a thickness of approximately ½ the thickness of the piece member body 331. The thickness of the first gripping claw 333 is substantially equal to the gap between the adjacent straight portions 102 and 102 of the band-shaped coil 100. The first gripping claw 333 is provided at a position in the vicinity of one end in the thickness direction of the piece member body 331 on the upper end surface 331a. The pair of first gripping claws 333 are disposed apart from each other on both end sides in the width direction of the piece member body 331 with a predetermined interval therebetween.

The first gripping claws 333 each have an upper end surface, and the upper end surface includes a meshing groove 333a that meshes with a tip of the comb tooth 22 of the coil winding jig 2. More specifically, as shown in FIG. 4, the tip of the comb tooth 22 of the coil winding jig 2 has an engaging portion 22a. The meshing groove 333a has a position and a shape capable of meshing with the engaging portion 22a of the coil winding jig 2.

The first gripping claws 333 each have a tapered surface 333b on the side opposite to the side on which the upper end surface 331a is provided. The tapered surface 333b allows the first gripping claw 333 to be formed in a slightly tapered shape as it moves away from the piece member body 331.

The pair of first gripping claws 333 has a rectangular recess 334 along the height direction of the piece member body 331 provided therebetween. The recess 334 is provided to span from the upper end surface 331a to the portion approximately ½ the height of the piece member body 331. The depth of the recess 334 along the thickness direction of the piece member body 331 has a depth of approximately ½ the thickness of the piece member body 331, similarly to the first gripping claw 333.

The piece member body 331 includes a rectangular protrusion 335 provided on one side surface 331b. The protrusion 335 is provided to protrude, in the thickness direction of the piece member body 331, in a block shape toward a direction perpendicular to the side surface 331b from the side surface 331b which is opposite to the side where the first gripping claw 333 is provided. The protrusion 335 is provided above a site which is approximately ½ the height of the piece member body 331 in the height direction. The height of the protrusion 335 along the height direction of the piece member body 331 is substantially equal to the height of the recess 334. The thickness of the protrusion 335 along the thickness direction of the piece member body 331 is substantially equal to the depth of the recess 334.

The protrusion 335 includes a second gripping claw 336 provided at an upper end portion thereof. Similarly to the first gripping claws 333, the second gripping claw 336 projects upward from the upper end surface 331a of the piece member body 331. Similarly to the first gripping claws 333, the thickness of the second gripping claw 336 is substantially equal to the gap between the adjacent straight portions 102 and 102 of the band-shaped coil 100. Since the second gripping claw 336 has the same width as the protrusion 335, as shown in FIG. 7, when the two piece members 33 and 33 are stacked with their directions aligned with each other, the second gripping claw 336 of the one piece member 33 is disposed between the pair of first gripping claws 333 and 333 of the other piece member 33.

The second gripping claw 336 has tapered surfaces 336a on both the side on which the upper end surface 331a is provided and the opposite side thereto. These tapered surfaces 336a allow the second gripping claw 336 to be formed in a slightly tapered shape as it moves away from the piece member body 331.

As shown in FIG. 7, the plurality of piece members 33 are aligned such that the first gripping claws 333 and the second gripping claws 336 are oriented in the same direction, and the protrusions 335 of the piece member 33 are stacked so as to be accommodated in the recess 334 of the adjacent piece member 33. As a result, the adjacent piece members 33 and 33 are in close contact with each other and stacked.

The piece member 33 includes a through hole 337a extending in the width direction of the piece member 33 at a portion in the vicinity of the root of the first gripping claw 333 and substantially at the same height as the upper end surface 331a of the piece member body 331. In addition, the protrusion 335 includes a through hole 337b extending in the width direction of the protrusion 335 at a portion in the vicinity of the root of the second gripping claw 336 and substantially at the same height as the upper end surface 331a of the piece member foody 331. As shown in FIG. 7, after the two piece members 33 and 33 are stacked, a shaft member 338 is inserted to span the through hole 337a and the through hole 337b which are in communication with each other. Thus, with the shaft member 338 as a rotation axis, the lower end sides of the plurality of pieces members 33 where the guide projections 332 are provided are coupled with each other in a rotatable (swingable) manner in the length direction of the conveyor 32, thereby forming an elongated conveyor 32.

As shown in FIGS. 3, 7, 8, and 9, in the conveyor 32, gripping grooves 321 each gripping the straight portion 102 of the band-shaped coil 100 is provided between the first, gripping claws 333 and 333, and between the second gripping claws 336 and 336 of the adjacent piece members 33, 33. The upper end surface 331a of the piece member body 331 is provided at the bottom of the gripping groove 321. The gripping grooves 321 each have a groove width capable of accommodating the straight portion 102 of the band-shaped coil 100. The groove width of the gripping groove 321 is substantially equal to the groove width along the circumferential direction of the comb-shaped groove 23 of the coil winding jig 2. The arrangement pitch of the gripping grooves 321 along the length direction of the conveyor 32 is substantially equal to the arrangement pitch of the comb-shaped groove 23 along the circumferential direction of the coil winding jig 2. Therefore, when the meshing groove 333a and the engaging portion 22a are engaged with each other, as shown in FIG. 3, the gripping groove 321 of the conveyor 32 and the comb-shaped groove 23 of the coil winding jig 2 are in communication with each other in the radial direction of the coil winding jig 2.

Figure 8:
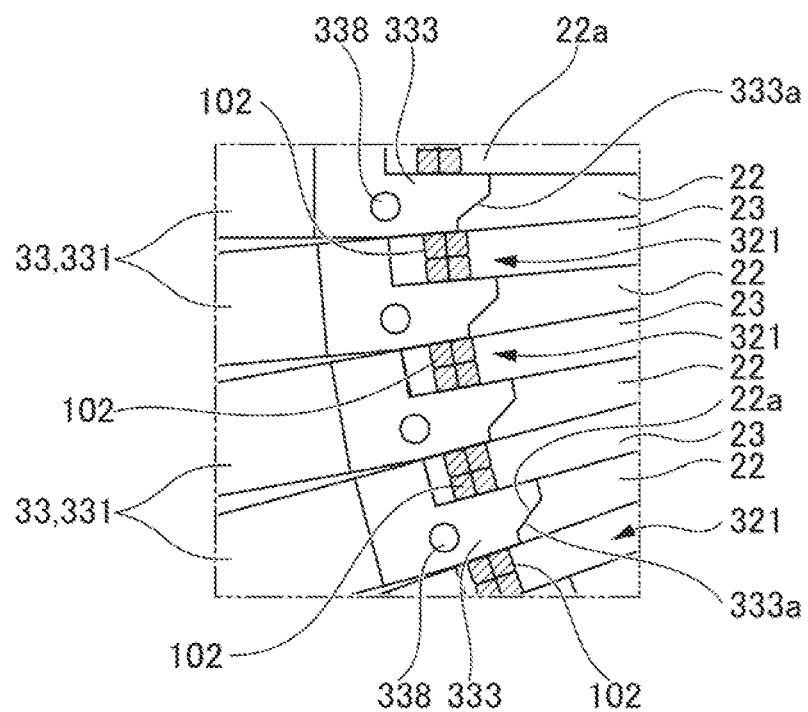
FIG. 8 is an enlarged view of a portion E in FIG. 1.

In the conveyor 32, each guide projection 332 of the piece member 33 is slidably accommodated in the guide groove 314 of the conveying rail 31, and protrudes toward the inside of the U-shaped conveying rail 31. Furthermore, as shown in FIG. 8, the meshing groove 333a of the piece member 33 meshes with the engaging portion 22a of the coil winding jig 2 at the location immediately below the coil winding jig 2, such that the conveyor 32 is in synchronization with the rotation of the coil winding jig 2 by the rotation of the coil winding jig 2 in the direction d1 so as to be movable in the direction d2. When the conveyor 32 moves in an arc shape along the pivot conveying unit 313 of the conveying rail 31, the guide projections 332 of the piece members 33 and 33 adjacent to each other rotate by means of the shaft member 338 so as to be isolated with the portions of the first gripping claw 333 and the second gripping claw 336 which are sites for gripping the straight portions 102 as references, such that the conveyor 32 is smoothly movable.

Figure 9:
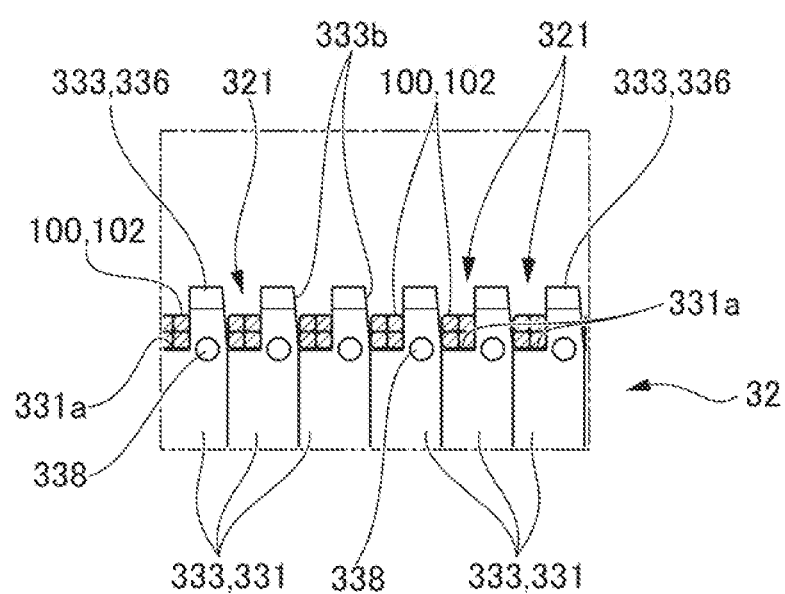
FIG. 9 is an enlarged view of a portion C in FIG. 1.

As shown in FIGS. 3, 8, and 9, in the conveyor 32 which is slidably disposed on the conveying rail 31, the first gripping claw 333 and the second gripping claw 336 are inserted into the gap between the straight portions 102 and 102 adjacent to each other in the length direction of the band-shaped coil 100, and the straight portions 102 are accommodated in the respective gripping grooves 321, whereby the band-shaped coil 100 is gripped. Therefore, it is possible for the conveyor 32 to convey the band-shaped coil 100 in a state of holding the straight portions 102 at regular intervals without displacing the straight portions. As shown in FIGS. 2 and 3, the side ends 103 of the band-shaped coil 100 protrude laterally on both sides in the moving direction of the conveyor 32. It should be noted that, in FIG. 1, the band-shaped coil 100 to be gripped by the conveyor 32 is not shown.

(Guide Member)

As shown in FIG. 1, the guide members 4 are made from a metal band-shaped plate material, and provided in a substantially U-shape laterally along the pivot conveying unit 313 of the conveying rail 31. In the guide members 4, the inside of the U-shaped portion is provided so as to face the direction of the coil winding jig 2 in the vicinity of the both ends of the coil winding jig 2 in the axial direction (the vertical direction relative to the paper plane of FIG. 1, and the left-right direction in FIG. 2) so as to sandwich the coil winding jig 2, and is fixed to the conveying rail 31.

The guide member 4 includes an introduction end 4a which introduces the side end 103 of the band-shaped coil 100 conveyed by the conveyor 32, a discharge end 4b which discharges the side end 103 of the band-shaped coil 100, and an inner wall surface 41 which guides the side end 103 from the introduction end 4a to the discharge end 4b. The inner wall surface 41 is formed by a curved surface which smoothly curves continuously from the introduction end 4a to the discharge end 4b so as to follow approximately ½ of the outer periphery of the coil winding jig 2.

Figure 10:
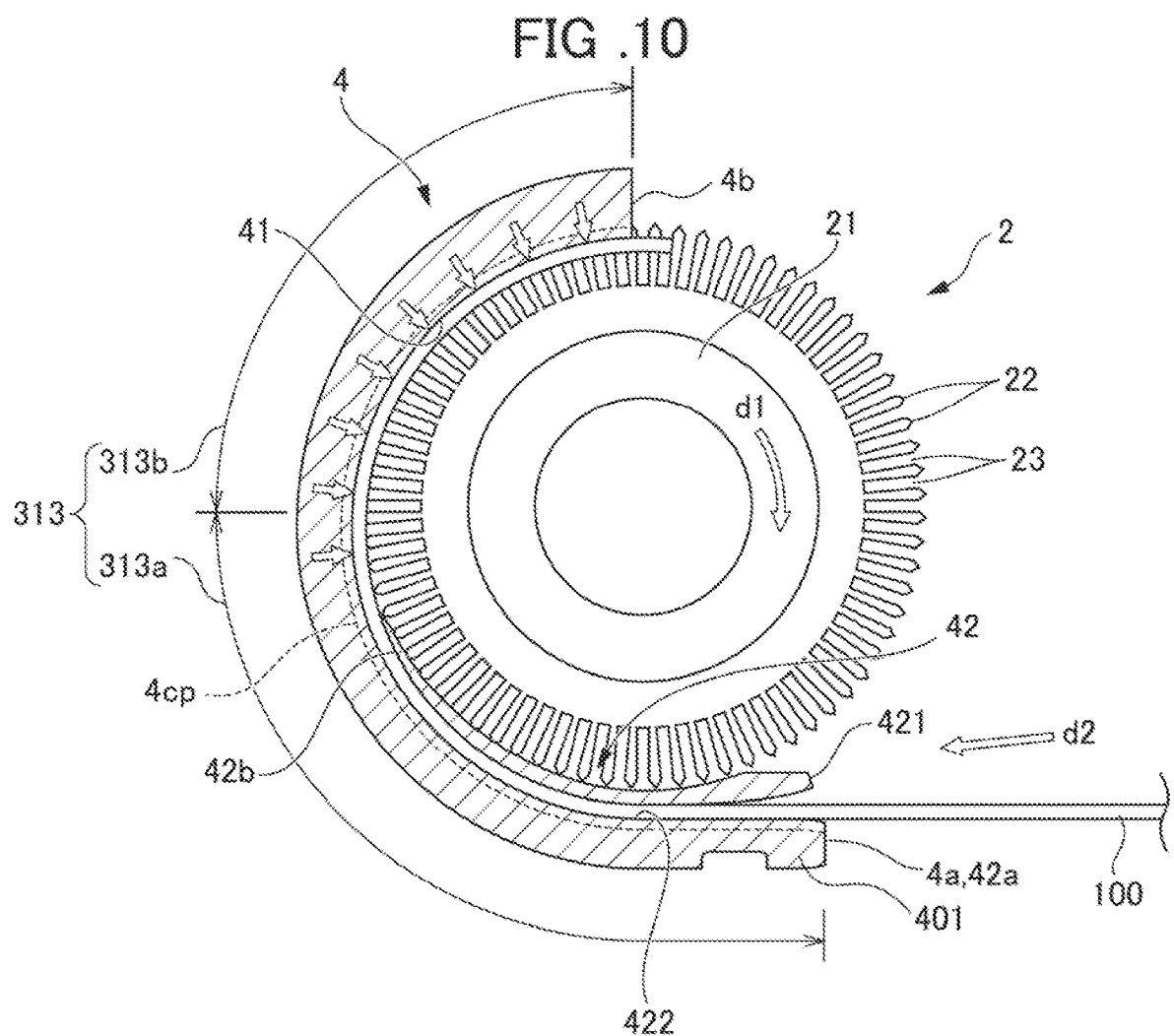
FIG. 10 is a cross-sectional view showing an aspect of the band-shaped coil being guided into an arc shape in the coil winding jig by a guide member.
Figure 11:
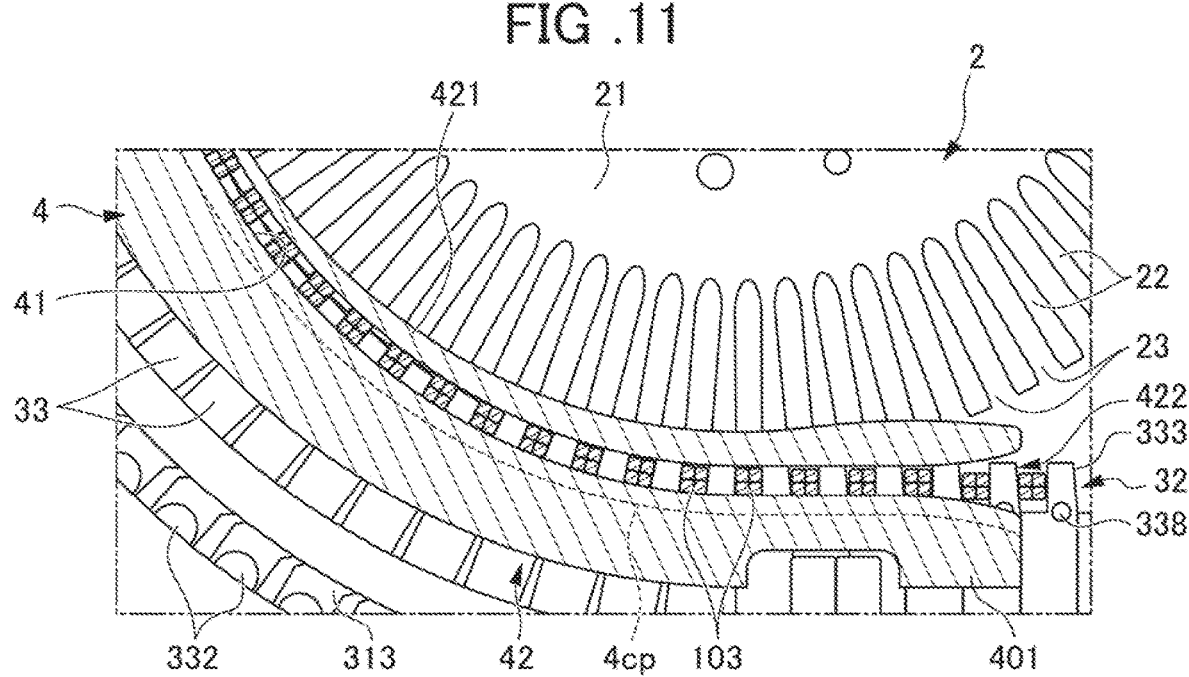
FIG. 11 is an enlarged cross-sectional view of a portion D in FIG. 1.
Figure 12:
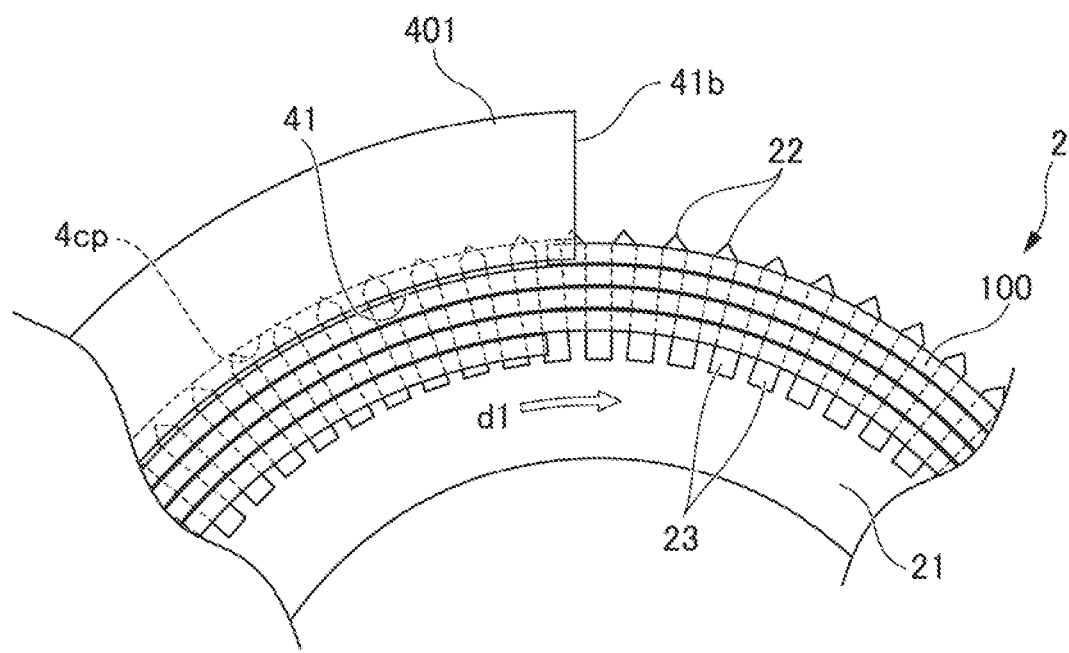
FIG. 12 is a partial enlarged view showing an aspect of the band-shaped coil being wound multiply on the coil winding

More specifically, the guide member 4 includes an outer-circumferential guide member 401 of a curvature in which the inner wall surface 41 on its own inner circumferential side follows the outer circumference of the coil winding jig 2, and a projecting-strip pressing portion 4cp is projected along the circumferential direction at the inner wall surface 41 of the outer-circumferential guide member 401. In FIGS. 10, 11 and 12, an arc part is illustrated as a dashed line in the side view corresponding to the base where the projecting-strip pressing portion 4cp projects. The surface on the inner circumferential side extending in the circumferential direction of the projecting-strip pressing portion 4cp presses while in sliding contact with the side end 103 of the band-shaped coil 100. The guide member 4 smoothly guides the entirety of the band-shaped coil 100 in an arc shape so as to follow the outer circumference of the coil winding jig 2, by bringing the side end 103 introduced from the introduction end 4a into contact with the projecting-strip pressing portion 4cp of the inner wall surface 41, while the band-shaped coil 100 is pivotally conveyed by the pivot conveying unit 313.

The curvature of the projecting-strip pressing portion 4cp on the arc-shaped inner wall surface 41 of the guide member 4 is formed so as to gradually change greatly as approaching the discharge end 4b from the introduction end 4a. More specifically, as shown in FIG. 10, the projecting-strip pressing portion 4cp of the inner wall surface 41 at the introduction end 4a is arranged somewhat more to the outer side in the radial direction than the outer circumference of the coil winding jig 2. However, the projecting-strip pressing portion 4cp of the inner wall surface 41 gradually reduces in diameter smoothly as approaching the discharge end 4b from the introduction end 4a. The projecting-strip pressing portion 4cp of the inner wall surface 41 at the discharge end 4b is arranged more to the inner side in the radial direction than the outer circumference of the coil winding jig 2. For this reason, the projecting-strip pressing portion 4cp of the inner wall surface 41 of the guide member 4 guides the band-shaped coil 100 so as to gradually round in an arc shape of a smaller diameter than the outside diameter of the coil winding jig 2, while pressing in sliding contact on the side end 103 of the band-shaped coil 100, as the band-shaped coil 100 approaches the second half portion 313b from the first half portion 313a of the pivot conveying unit 313.

The band-shaped coil 100 is gradually pressed toward the coil winding jig 2, by being guided to the projecting-strip pressing portion 4cp of inner wall surface 41 of the guide member 4, as approaching the second half portion 313b from the first half portion 313a of the pivot conveying unit 313. The straight portion 102 gripped by the conveyor 32 thereby forcibly separates from the gripping groove 321 so as to lift up, and gradually moves towards the inside of the comb teeth-shaped groove 23 of the coil winding jig 2. The end edge of the projecting-strip pressing portion 4cp, which the discharge end 4b of the guide member 4, is arranged more to the inner side in the radial direction than the outer circumference of the coil winding jig 2; therefore, the straight portion 102 is completely inserted into the comb teeth-shaped groove 23 of the coil winding jig 2. Subsequently, the band-shaped coil 100 is wound on the coil winding jig 2 by rotation of the coil winding jig 2. It should be noted that, in FIGS. 10 and 12, the conveyor 32 is omitted from illustration, and the band-shaped coil 100 is shown to be simplified.

It should be noted the guide member 4 is not limited to a structure having the inner wall surface 41 which is continuous over the entirety of the pivot conveying unit 313 as in the present embodiment. The guide member 4, although not Illustrated, may be a structure arranging a plurality of guide rollers so as to follow the pivot conveying unit 313, for example. However, in the viewpoint of configuring so as to be able to continuously guide the band-shaped coil 100 to the comb teeth-shaped groove 23 of the coil winding jig 2, and be able to smoothly insert the straight portion 102 into the comb teeth-shaped groove 23, the guide member 4 preferably has the inner wall surface 41 contacting at the wall surface with the side end 103 at the second half portion 313$b$ of the pivot conveying unit 313. In the viewpoint of configuring so as to be able to smoothly guide the band-shaped coil 100 into an arc shape over the entirety of the pivot conveying unit 313, and be able to smoothly insert the straight portion 102 into the comb teeth-shaped groove 23 of the coil winding jig 2, the guide member 4 preferably has the inner wall surface 41 at which the aforementioned projecting-strip pressing portion 4$cp$ is formed contacting at the wall surface with the side end 103 in the entirety of the pivot conveying unit 313 as in the present embodiment.

As shown in FIGS. 1 and 2, the guide member 4 has, at the side of the introduction end 4$a$ thereof, the pair of reforming portions 42 for causing the band-shaped coil 100 introduced to the pivot conveying unit 313 to forcibly deform and reform so as to curve into an arc shape along the outer circumference of the coil winding jig 2. In the guide member 4, the range in which the reforming portion 42 is provided is within the range of the first half portion 313$a$ of the pivot conveying unit 313. More specifically, the reforming portion 42, for example, can be provided from the introduction end 4$a$ of the guide member 4 over a range of approximately ½ to approximately ¾ of the first half portion 313$a$ of the pivot conveying unit 313. The projecting-strip pressing portion 4$cp$ of the guide member 4 is provided to at least span the range of the reforming portion 42; however, in the present embodiment, the projecting-strip pressing portion 4$cp$ is provided to span the entirety of the pivot conveying unit 313, which is the overall length of the guide member 4.

Reforming to the band-shaped coil 100 by the reforming portion 42 is performed by configuring to make a bending habit along the curvature of the guide member 4 in the band-shaped coil 100, by the projecting-strip pressing portion 4$cp$ on the inner circumferential side of the guide member 4 pressing the band-shaped coil 100 being pivotally conveyed while in sliding contact. More specifically, a steady laminated part SLP of the band-shaped coil 100 at which a partial difference in the coil lamination number does not arise by the folding portion extending from the straight portion 102 to the side end 103 of the band-shaped coil 100 makes a bending habit by the projecting-strip pressing portion 4$cp$ pressing while in sliding contact.

Figure 13:
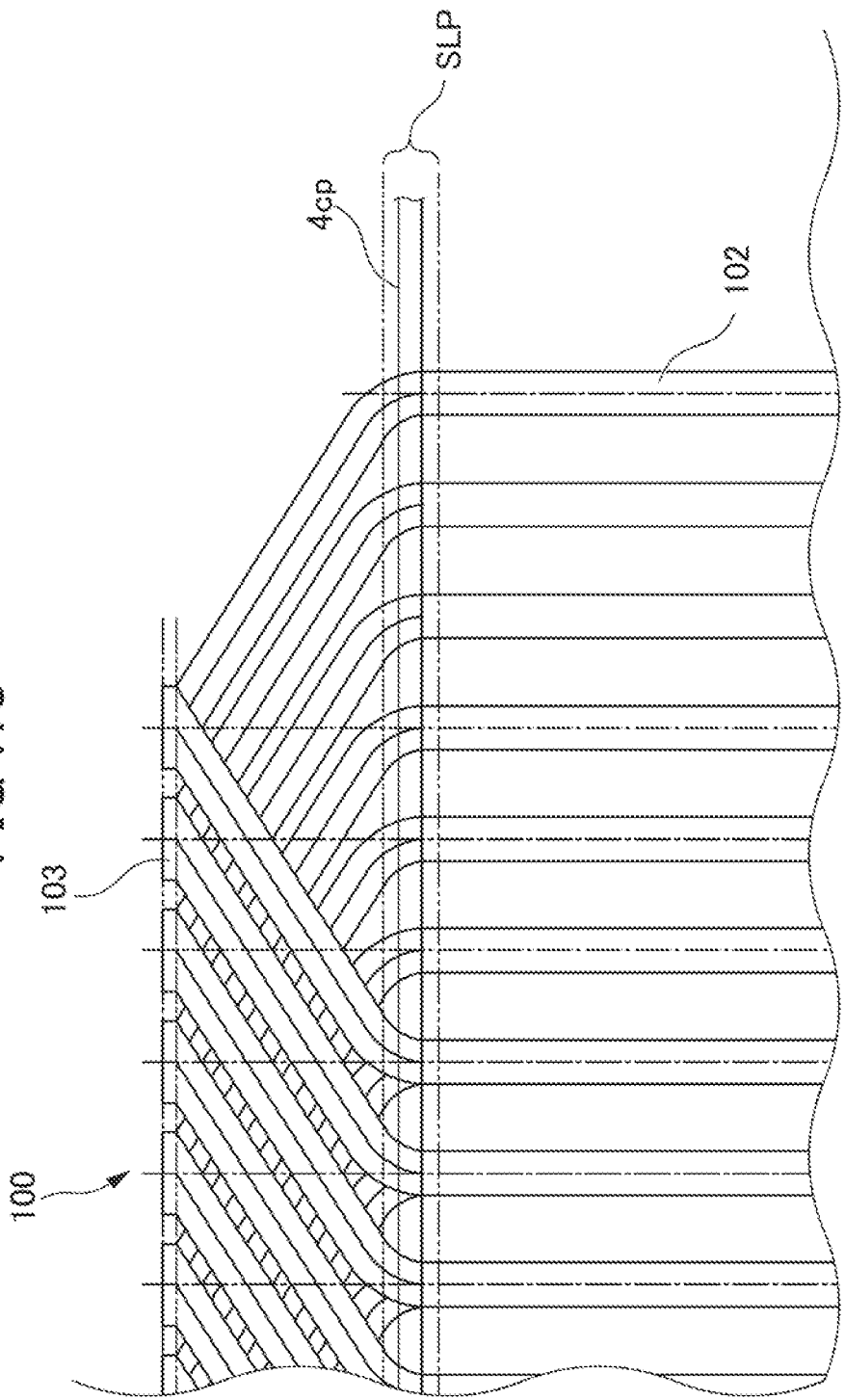
FIG. 13 is a view explaining the positional relationship between the projecting-strip pressing portion formed in the guide member of FIG. 10 and the band-shaped coil.
Figure 14:
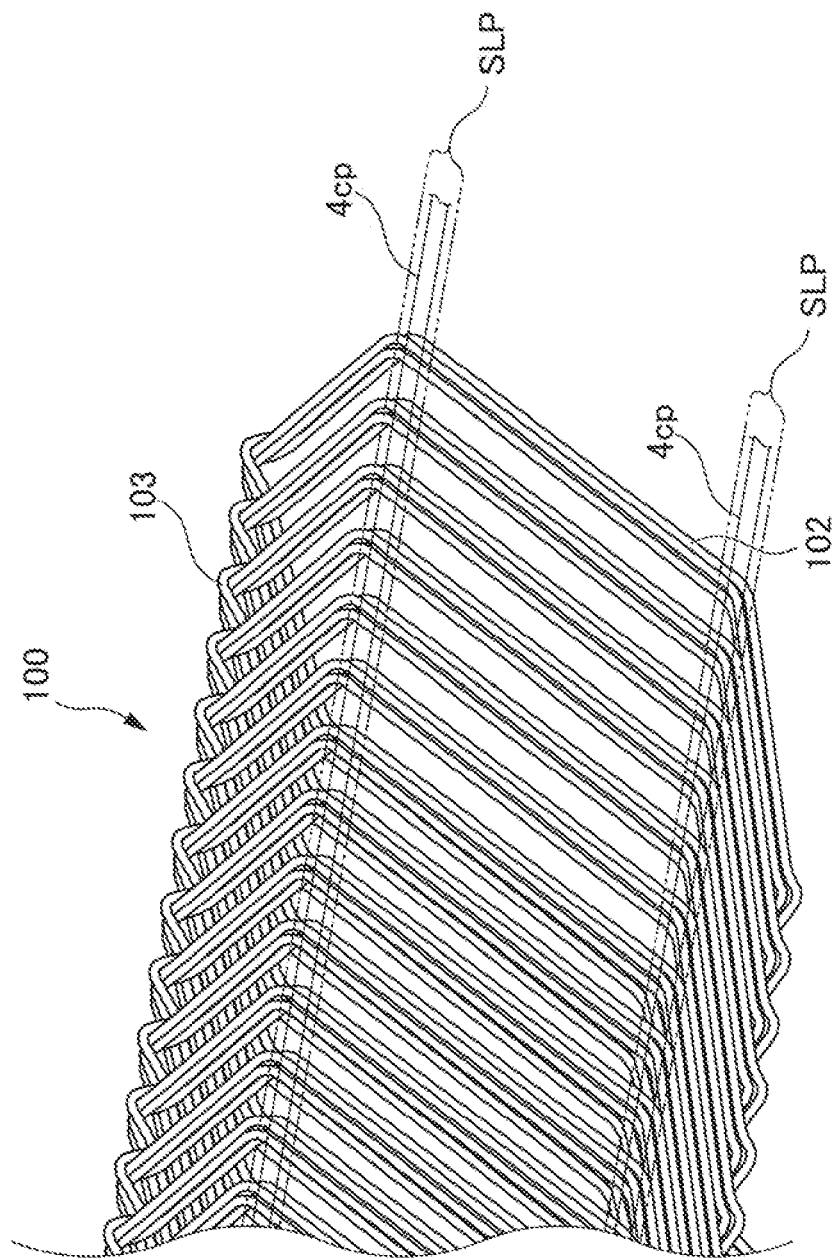
FIG. 14 is a view explaining by showing the positional relationship between the projecting-strip pressing portion of FIG. 13 and band-shaped coil from another angle.

Herein, FIG. 13 shows the positional relationship between the projecting-strip pressing portion 4$cp$ formed in the outer-circumferential guide member 401 in the guide member 4 of FIG. 10 and the band-shaped coil 100. In addition, in FIG. 14, the positional relationship between the projecting-strip pressing portion 4$cp$ of FIG. 13 and the band-shaped coil 100 is shown from a different angle. In FIG. 13, one side end 103 side of the band-shaped coil 100 actually bent into an arc in a direction perpendicular to the paper plane is shown to be expanded planarly. A folding portion of a coil conductor which started to bend from each straight portion 102 of the band-shaped coil 100 towards the corresponding side end 103 serves as a steady laminated part SLP of the band-shaped coil 100 at which a partial difference in coil lamination number does not arise.

The reforming portion 42 is configured by the projecting-strip pressing portion 4$cp$ of the outer-circumferential guide member 401 and the inner-circumferential guide member 421 of the guide member 4. The inner-circumferential guide member 421 is formed so as to curve in an arc shape smoothly along the curvature of the projecting-strip pressing portion 4$cp$. The reforming portion 42 are respectively arranged so as to sandwich the coil winding jig 2 from both end sides in the axial direction. In the reforming portion 42, a reforming groove 422 which sandwiches the side end 103 is formed between the projecting-strip pressing portion 4$cp$ of the outer-circumferential guide member 401 and the inner-circumferential guide member 421. The projecting-strip pressing portion 4$cp$ of the outer-circumferential guide member 401 of the reforming portion 42 contacts and supports a surface on the outer side in the radial direction of the side end 103 of the band-shaped coil 100, and the inner-circumferential guide member 421 contacts and supports a surface on the inner side in the radial direction of the side end 103 of the band-shaped coil 100.

The reforming portion 42 causes the side end 103 of the band-shaped coil 100 introduced to the introduction end 4$a$ of the guide member 4 to forcibly deform so as to curve into an arc shape, by conveying while being accepted and clamped in the reforming groove 422. The band-shaped coil 100 is reformed into an arc shape, at an early stage of introduction of the pivot conveying unit 313 before winding on the coil winding jig 2, and the force trying to elastically recover to a flat shape while guided to an arc shape by the inner wall surface 41 of the guide member 4 subsequently is suppressed. Therefore, the band-shaped coil 100 is smoothly and precisely molded into the substantially cylindrical wound shape, in combination with being guided into the arc shape by the guide member 4.

In FIG. 15, the vicinity of a contact site between the projecting-strip pressing portion 4$cp$ and band-shaped coil 100 of FIG. 13 is shown to be enlarged. The folding portion towards the side end 103 from the gripping portion of the band-shaped coil 100 in which the straight portions 102 are gripped in the conveyor 32 offers the steady laminated part SLP of the band-shaped coil 100 at which a partial difference in coil lamination number does not arise. The projecting-strip pressing portion 4$cp$ projected to the outer-circumferential guide member 401 is positioned so that a flat part of the tip thereof faces this steady laminated part SLP. The projecting-strip pressing portion 4$cp$ presses the steady laminated part SLP of the band-shaped coil 100 while in sliding contact.

Figure 16A:
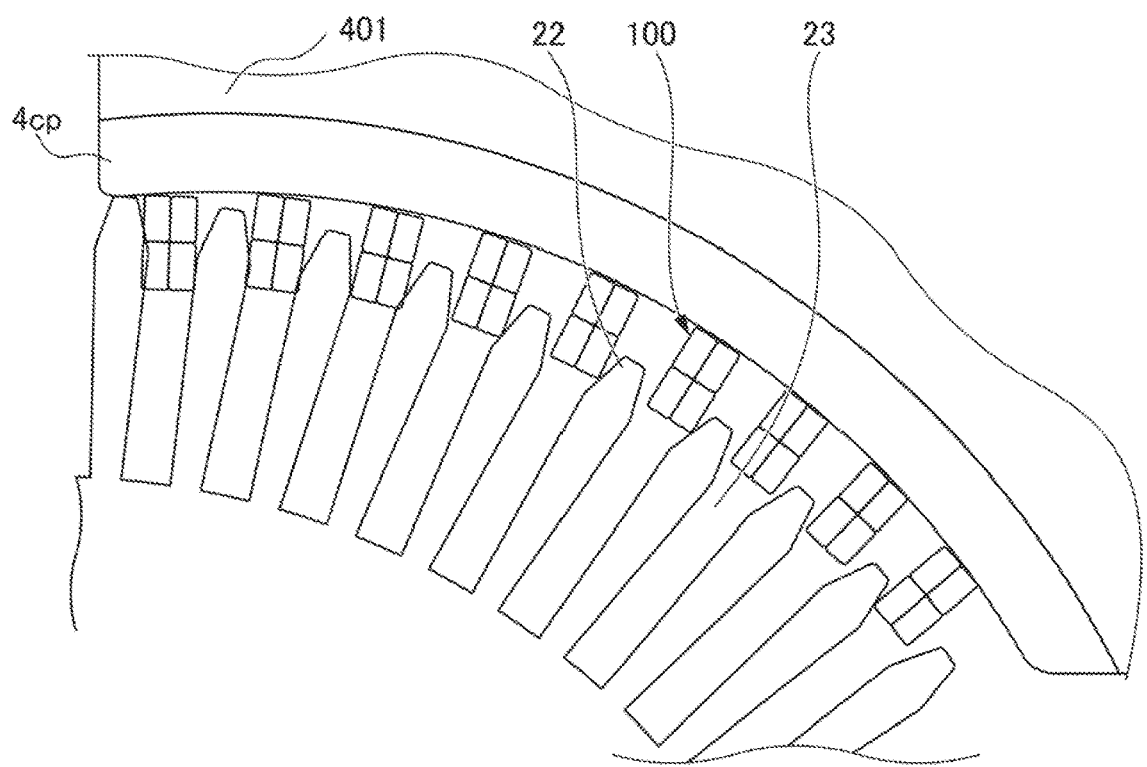
FIG. 16A is a view explaining the pressing action by the projecting-strip pressing portion on the band-shaped coil of FIG. 13.
Figure 16B:
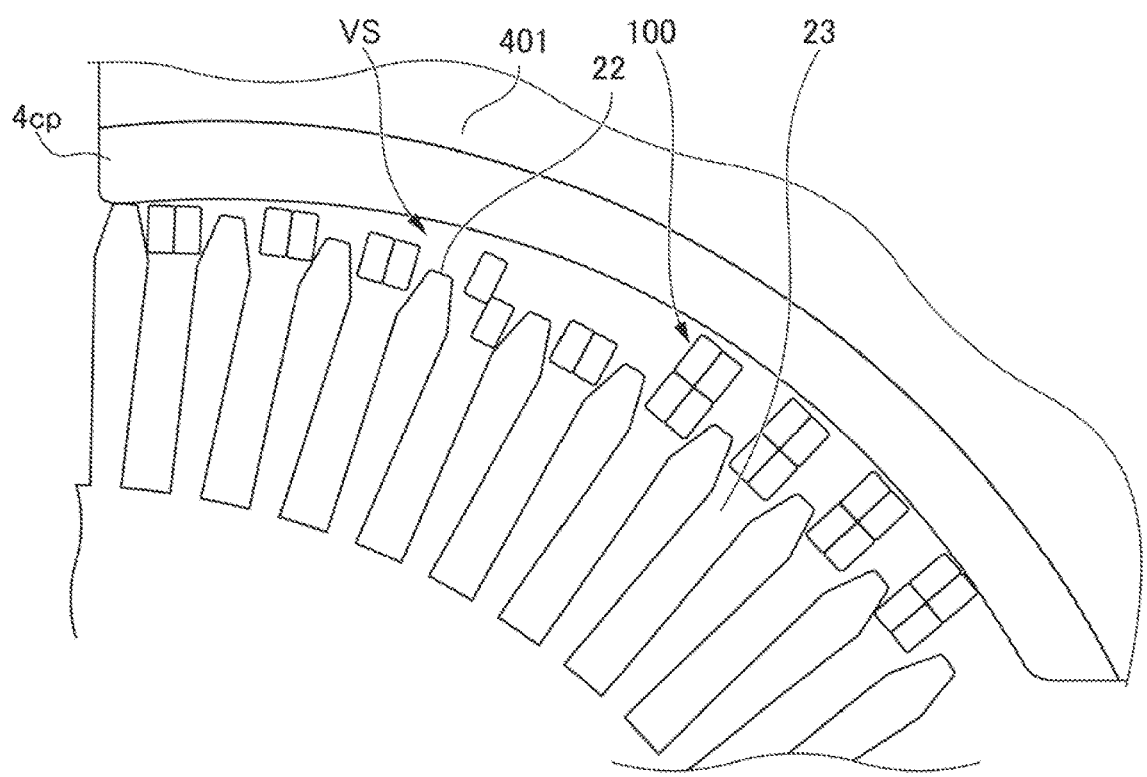
FIG. 16B is a view explaining the pressing action of a common guide member on a band-shaped coil in comparison with FIG. 16A.

Next, the action of the projecting-strip pressing portion 4$cp$ making sliding contact with the steady laminated part SLP of the band-shaped coil 100, and pressing this sliding contact position, while comparing FIG. 16A and FIG. 16B. FIG. 16A shows a case of the projecting-strip pressing portion 4$cp$ being provided at a portion just making sliding contact with the steady laminated part SLP of the band-shaped coil 100. FIG. 16B shows a case of the projecting-strip pressing portion 4$cp$ being provided at a position deviated from the position in FIG. 16A. As easily understood by referencing FIG. 16A, in the steady laminated part SLP, a difference in coil lamination number does not arise at any position in the circumferential direction along the pivotal conveying of the band-shaped coil 100.

In other words, in the case of FIG. 16A, the coil lamination number of the steady laminated part SLP is steady at 2 layers. For this reason, the projecting-strip pressing portion 4cp makes sliding contact equally on the outer circumferential side of each coil conductor of the band-shaped coil 100 to press this sliding contact site to the inner-circumferential side. For this reason, the coil conductor is orderly pushed to the comb-shaped grooves 23 of the coil winding jig 2, without producing a disturbance in lamination.

In the case of FIG. 16B, since the projecting-strip pressing portion 4cp is not facing the steady laminated part SLP of the band-shaped coil 100, a difference appears in the coil lamination number by the position in the circumferential direction along the pivot conveying of the band-shaped coil 100. In other words, the coil lamination number has a level difference between a one-layer location and two-layer location according to the position in the circumferential direction, and a void VS appears at the location of the level difference. For this reason, the projecting-strip pressing portion 4cp is inhibited from equally making sliding contact with the outer-circumferential side of each coil conductor of the band-shaped coil 100, and a location which cannot press the coil conductor to the inner-circumferential side partially occurs.

(Coil Forming Method)

Next, a method of forming the band-shaped coil 100 into a substantially cylindrical wound state by the coil forming apparatus 1 will be described.

First, the coil winding jig 2 is provided to be rotatable by the driving of a motor (not shown) Inside the U-shaped portion of the conveying rail 31 of the coil forming apparatus 1. After the coil winding jig 2 is provided in the coil forming apparatus 1, the band-shaped coil 100 which is formed in advance in a long corrugated band shape is supplied to the conveyor 32 which is provided in the straight conveying unit 311 on the lower side of the conveying rail 31 by a coil feeding device or an operator (not shown). The band-shaped coil 100 is gripped by the conveyor 32 by inserting the first gripping claws 333 and the second gripping claws 336 of the respective piece members 33 of the conveyor 32 into the gaps between the adjacent straight portions 102 and 102, and by accommodating the straight portions 102 in the gripping grooves 321, respectively.

Thereafter, the conveyor 32 gripping the base-shaped coil 100 is pressed by a conveyer pressing device (not shown) or an operator, and the straight conveying unit 311 is moved toward the coil winding jig 2 so that the meshing groove 333a of the piece member 33 and the engaging portion 22a of the coil winding jig 2 are engaged with each other. When the coil winding jig 2 is rotationally driven in the direction d1 after the meshing groove 333a and the engaging portion 22a are meshed with each other immediately below the coil winding jig 2, the conveyor 32 moves the conveying rail 31 along the direction d2 in synchronization with the rotation of the coil winding jig 2, and pivotally conveys the band-shaped coil 100 along the outer periphery of the coil winding jig 2 (pivot conveying step).

When the conveyor 32 reaches the pivot conveying unit 313, the side end 103 of the band-shaped coil 100 is first introduced into the reforming groove 422 of the reforming portion 42 from the introduction end 4a of the guide member 4. Following this introduction, the side end 103 is pivotally conveyed while sandwiched between the projecting-strip pressing portion 4cp which projected along the circumferential direction at the inner wall surface 41 of the outer-circumferential guide member 401, and the inner-circumferential guide member 421. Upon this pivotal conveying, the projecting-strip pressing portion 4cp presses while in sliding contact the steady laminated part SLP in which a partial difference in coil lamination number does not arise at the folding portion extending the straight portion 102 to side end 103 to reform the band-shaped coil 100. In the steady laminated part SLP, a difference in the coil lamination number does not arise at any position in the circumferential direction along the pivot conveying of the band-shaped coil 100. For this reason, the projecting-strip pressing portion 4cp makes sliding contact equally to the outer circumferential side of the side end 103 of the band-shaped coil 100. For this reason, the band-shaped coil 100 is reformed by forcibly deforming so as to bend into an arc shape along the reforming groove 422 (reforming step of guiding step).

The band-shaped coil 100 passing through the reforming portion 42 is guided so as to be gradually rounded in an arc shape while being pivotally conveyed along at least a portion of the outer periphery of the coil winding jig 2 along the inner wall surface 41 of the guide member 4, i.e., a range of approximately ½ the outer periphery of the coil winding jig 2, accompanying the rotation of the coil winding jig 2.

Since the curvature of the projecting-strip pressing portion 4cp on the inner wall surface 41 of the outer-circumferential guide member 401 gradually increases from the first half portion 313a to the second half portion 313b of the pivot conveying unit 313, the side end 103 of the band-shaped coil 100 is pressed by the projecting-strip pressing portion 4cp so as to gradually decrease the diameter inwardly in the radial direction. Thus, the band-shaped coil 100 is rounded to have a smaller diameter than the outer diameter of the coil winding jig 2.

The side end 103 which is pressed against the projecting-strip pressing portion 4cp on the inner wall surface 41 of the outer-circumferential guide member 401 gradually separates the straight portions 102 from the gripping grooves 321 toward the comb-shaped groove 23 of the coil winding jig 2 as the band-shaped coil 100 approaches the discharge end 4bb of the guide member 4. As shown in FIG. 10, the straight portions 102 completely detached from the gripping grooves 321 are inserted into the respective comb-shaped grooves 23 of the coil winding jig 2 in communication with the gripping grooves 321, while being pressed against projecting-strip pressing portion 4cp (guiding step).

In the aforementioned guiding step, the projecting-strip pressing portion 4cp presses the steady laminated part SLP of the band-shaped coil 100 while in sliding contact. At the steady laminated part SLP, a difference in the coil lamination number does not arise at any position in the circumferential direction along the pivotal conveying of the band-shaped coil 100. For this reason, the projecting-strip pressing portion 4cp makes equal sliding contact on the outer circumferential side of each coil conductor of the band-shaped coil 100, and presses the sliding contact site thereof to the inner circumferential side. For this reason, the coil conductor is orderly pushed to the comb-shaped grooves 23 of the coil winding jig 2, without producing a disturbance in lamination. Subsequently, the band-shaped coil 100 is discharged from the discharge end 4b of the guide member 4, while being wound on the coil winding jig 2, accompanying rotation of the coil winding jig 2.

Figure 17:
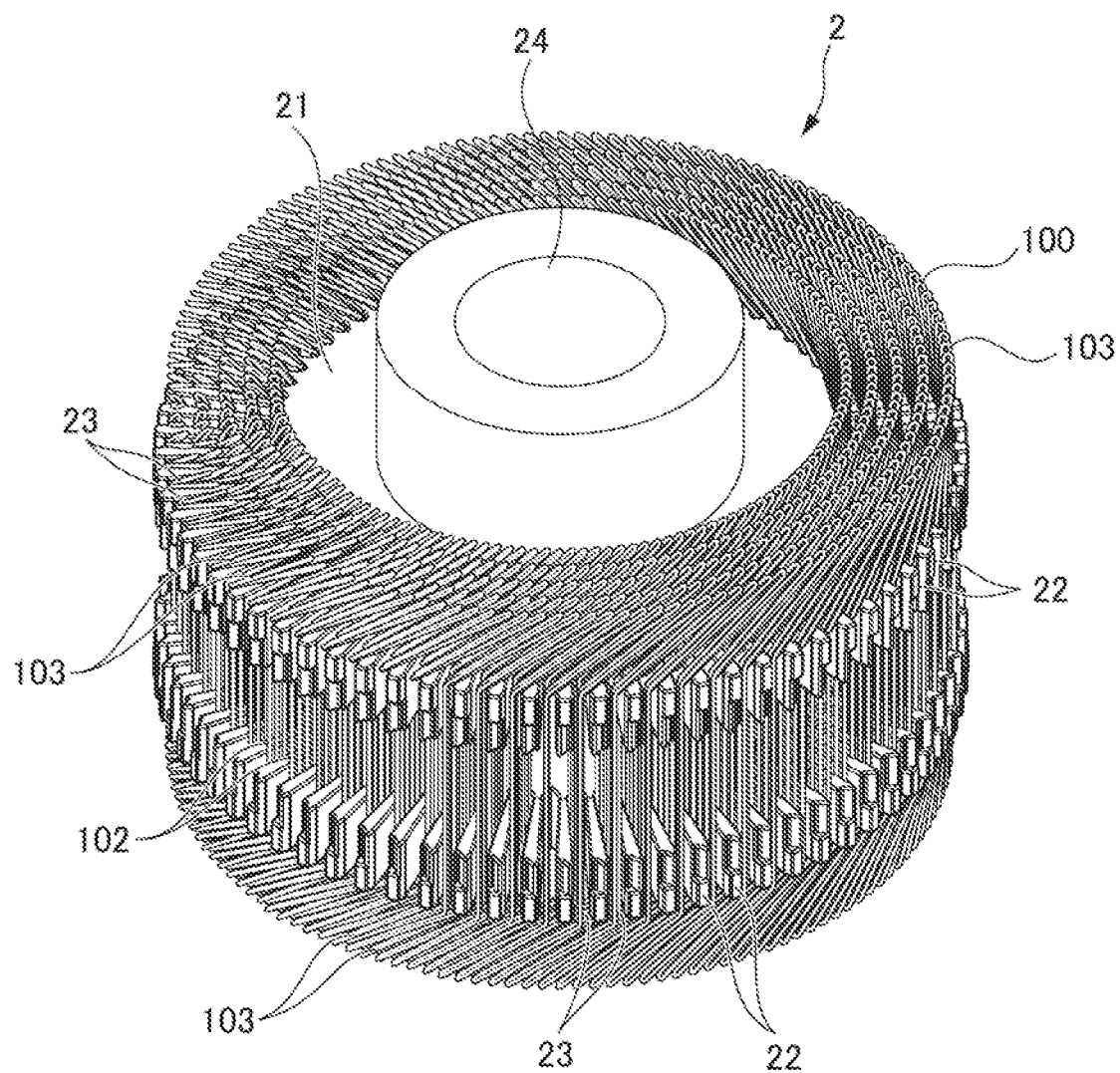
FIG. 17 is a perspective view showing a state in which a band-shaped coil is formed into a wound state on a coil winding jig.

If the entirety of the conveyor 32 finishes moving along the conveying rails 31, the band-shaped coil 100 is wound four times around the coil winding jig 2 to be multiply wound, as shown in FIG. 12, by the straight portions 102 being introduced into the comb teeth-shaped grooves 23 in a layered manner. The band-shaped coil 100 is thereby easily molded into a substantially cylindrical wound state, as shown in FIG. 17. Since the straight portions 102 of the band-shaped coil 100 in the wound state is accommodated within the comb teeth-shaped grooves 23, there is no concern of displacing. Therefore, the band-shaped coil 100 can stably hold the substantially cylindrical wound state. It should be noted that the band-shaped coil is not limited to being multiply wound on the coil winding jig 2.

According to the above explained coil forming apparatus 1, the following effects are exerted. That is, the coil forming apparatus 1 of the present embodiment forms the band-shaped coil 100 in a wound state, and the band-shaped coil 100 includes the plurality of straight portions 302 and the side ends 103 provided on both ends of the plurality of straight portions 102.

The coil forming apparatus 1 includes: the coil winding jig 2 that winds the band-shaped coil 100, the coil winding jig 2 including the plurality of comb-shaped grooves 23 on the outer periphery thereof, each of which can hold a respective one of the plurality of straight portions 102 therein; the coil conveying mechanism unit 3 that pivotally conveys the band-shaped coil 100 along at least a portion of the outer periphery of the coil winding jig 2; and the guide members 4 that are respectively provided in the vicinity of both ends of the coil winding jig 2 in the axial direction, and guide the band-shaped coil 100 into an arc shape along an outer circumference of the coil winding jig 2 while being in contact with the side end 103, and insert the plurality of straight portions 102 into each of the plurality of comb-shaped grooves 23, by the second half portion 313*b* of the pivot conveying unit 313 which pivotally conveys the band-shaped coil 100.

The guide member 4 has the reforming portion 42 which causes the band-shaped coil 100 to deform and reform into an arc shape along the outer circumference of the coil winding jig 2, in a state sandwiching the side end 103 of the band-shaped coil 100 in the first half portion 313*a* of the pivot conveying unit 313 which pivotally conveys the band-shaped coil 100.

The guide member 4 has, in at least the reforming portion 42, the projecting-strip pressing portion 4*cp* projected along the circumferential direction on the inner-circumferential side of the guide member 4 so as to press while in sliding contact the steady laminated part SLP of the band-shaped coil in which a partial difference in coil lamination number does not arises in the folding portion extending the straight portion 102 to the side end 103. In the steady laminated part SLP, a difference in the coil lamination number does not arise at any position in the circumferential direction along the pivotal conveying of the band-shaped coil 100.

For this reason, the projecting-strip pressing portion 4*cp* makes sliding contact and presses evenly on the outer-circumferential side of the side end 103 of the band-shaped coil 100. Therefore, the band-shaped coil 100 can forcibly deform so as to bend along the reforming groove 422 and reform into an arc shape, without causing so-called looseness in which adjacent coil conductors become uneven. Therefore, it is possible to form the band-shaped coil 100 into the wound state precisely and orderly.

The guide member 4 of the present embodiment is configured to include the outer-circumferential guide member 401 of curvature in which the inner-circumferential surface side follows the outer circumference of the coil winding jig 2, and the projecting-strip pressing portion 4*cp* is projected at the inner-circumferential surface of the outer-circumferential guide member 401. Therefore, it is possible to provide the projecting-strip pressing portion 4*cp* at a portion suited to pressing while in sliding contact the steady laminated part SLP in which a partial difference in coil lamination number does not arise.

The coil forming method described above has the following advantageous effects. More specifically, the coil forming method of the present embodiment is for forming a band-shaped coil 100 having a plurality of straight portions 102 and side ends 103 disposed at both ends of the plurality of straight portions 102 into a wound state, by winding on a coil winding jig 2 having a plurality of comb-shaped grooves 23 on an outer periphery thereof, each of which can hold a respective one of the plurality of straight portions 102 therein, the method comprising: a pivotal conveying step of pivotally conveying the band-shaped coil 100 along at least part of an outer circumference of the coil winding jig 2; and a guiding step of using guide members 4 respectively arranged in a vicinity of both ends of the coil winding jig 2 in an axial direction to guide the side ends 103 of the band-shaped coil 100 into an arc shape following an outer circumference of the coil winding jig 2, and inserting the plurality of straight portions 102 into a respective one of the plurality of comb-shaped grooves 23 by a second half portion 313*b* of pivotal conveying of the band-shaped coil, in which the guiding step includes a reforming step (for example, step performed by reforming portion 42 described later) of deforming and reforming the band-shaped coil 100 into an arc shape following an outer circumference of the coil winding jig 2, in a state sandwiching the side end 103 of the band-shaped coil 100 by a first half portion 313*a* of pivotal conveying of the band-shaped coil 100, and the guiding step, at least in the reforming step, presses and reforms a steady laminated part SLP of the band shaped coil 100 in which a partial difference in a coil lamination number does not arise by a folding portion extending from the straight 102 portion to the side end 103, while in sliding contact by projecting-strip pressing portion 4*cp* which is projected along a circumferential direction at an inner circumferential side of the guide member 4. According to this, since there is no difference in the coil lamination number at the abutting site of the projecting-strip pressing portion, it is possible to make a uniform winding without looseness of the coil conductor arrangement occurring, and thus possible to perform a high-efficiency coil forming operation.

Although an embodiment of the present invention has been explained above, the present invention is not to be limited thereto. The configurations of detailed parts may be modified where appropriate within the scope of the gist of the present invention. For example, in the aforementioned embodiment, the projecting-strip pressing portion 4*cp* projects at the inner-circumferential surface of the outer-circumferential guide member 401 of a curvature in which the inner-circumferential surface side follows the outer circumferential of the coil winding jig 2; however, an alternate configuration can be adopted. In other words, the outer-circumferential guide member 401 itself may be configured with a width dimension corresponding to the steady laminated part SLP of the band-shaped coil 100, or may be configured so that itself functions as the projecting-strip pressing portion 4*cp*.

EXPLANATION OF REFERENCE NUMERALS

1 coil forming apparatus
2 coil winding jig
23 comb teeth-shaped groove
3 coil conveying mechanism unit
313 pivot conveying unit
313*a* first half portion
313*b* second half portion
4 guide member 4cp projecting-strip pressing portion
41 inner wall surface
42 reforming portion
401 outer-circumferential guide member
100 band-shaped coil
102 straight portion
103 side end
SLP steady laminated part
VS void

What is claimed is:

1. A coil forming apparatus that forms a band-shaped coil in a wound state, the band-shaped coil including a plurality of straight portions and side ends provided on both ends of the plurality of straight portions, the coil forming apparatus comprising:
   a coil winding jig that winds the band-shaped coil, the coil winding jig including a plurality of comb-shaped grooves on an outer periphery thereof, each of which can hold a respective one of the plurality of straight portions therein;
   a coil conveying mechanism that pivotally conveys the band-shaped coil along at least a portion of the outer periphery of the coil winding jig; and
   guide members that are provided in a vicinity of both ends of the coil winding jig in an axial direction, and guide the band-shaped coil in an arc shape following an outer circumference of the coil winding jig while being in contact with the side end, and insert the plurality of straight portions respectively into the plurality of comb-shaped grooves by a second half portion of the pivotally conveying band-shaped coil,
   wherein the guide member has a reforming portion which deforms and reforms the band-shaped coil into an arc shape following the outer circumference of the coil winding jig, in a state sandwiching the side end of the band-shaped coil in a first half portion of the pivotally conveying band-shaped coil, and has, at least in the reforming portion, a projecting-strip pressing portion which is projected along a circumferential direction at an inner circumferential side of the guide member so as to be in sliding contact with a steady laminated part of the band-shaped coil in which a coil lamination number of the band-shaped coil is constant at a folding portion extending from the straight portion to the side end, and
   wherein the guide member is configured to include an outer-circumferential guide member of a curvature in which an inner-circumferential surface side follows an outer circumference of the coil winding jig, wherein the projecting-strip pressing portion is projected at an inner-circumferential surface of the outer-circumferential guide member.

2. A coil forming method for forming a band-shaped coil having a plurality of straight portions and side ends disposed at both ends of the plurality of straight portions into a wound state, by winding on a coil winding jig having a plurality of comb-shaped grooves on an outer periphery thereof, each of which can hold a respective one of the plurality of straight portions therein, the method comprising:
   a pivotal conveying step of pivotally conveying the band-shaped coil along at least part of an outer circumference of the coil winding jig; and
   a guiding step of using guide members respectively arranged in a vicinity of both ends of the coil winding jig in an axial direction to guide the side ends of the band-shaped coil into an arc shape following an outer circumference of the coil winding jig, and inserting the plurality of straight portions into a respective one of the plurality of comb-shaped grooves by a second half portion of the pivotally conveying band-shaped coil,
   wherein the guiding step includes a reforming step of deforming and reforming the band-shaped coil into an arc shape following an outer circumference of the coil winding jig, in a state sandwiching the side end of the band-shaped coil by a first half portion of the pivotally conveying band-shaped coil, and
   wherein the guiding step, at least in the reforming step, presses and reforms a steady laminated part of the band shaped coil in which a coil lamination number of the band-shaped coil is constant at a folding portion extending from the straight portion to the side end, while in sliding contact by a projecting-strip pressing portion which is projected along a circumferential direction at an inner circumferential side of the guide member.

3. The coil forming apparatus according to claim 1, wherein at the steady laminated part, a difference in the coil lamination number does not arise at any position in the circumferential direction along pivotal conveying of the band-shaped coil.

4. The coil forming apparatus according to claim 1, wherein the projecting-strip pressing portion is positioned so that a flat part of a tip thereof faces the steady laminated part.

5. The coil forming method according to claim 2, wherein at the steady laminated part, a difference in the coil lamination number does not arise at any position in the circumferential direction along pivotal conveying of the band-shaped coil.

6. The coil forming method according to claim 2, wherein the projecting-strip pressing portion is positioned so that a flat part of a tip thereof faces the steady laminated part.

* * * * *